US009582605B2

(12) United States Patent
Kim et al.

(10) Patent No.: US 9,582,605 B2
(45) Date of Patent: Feb. 28, 2017

(54) GENERATING USER SPECIFIC APPLICATIONS FOR PERFORMING FUNCTIONS IN A USER DEVICE AND METHOD FOR CONTROLLING THE SAME

(71) Applicant: LG ELECTRONICS INC., Seoul (KR)

(72) Inventors: Uniyoung Kim, Seoul (KR); Junsic Park, Seoul (KR); Goeun Lee, Seoul (KR); Jungeun Kim, Seoul (KR); Gangseub Lee, Seoul (KR); Kunsik Lee, Seoul (KR); Hyungnam Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 173 days.

(21) Appl. No.: 13/679,360

(22) Filed: Nov. 16, 2012

(65) Prior Publication Data

US 2013/0179785 A1   Jul. 11, 2013

(30) Foreign Application Priority Data

Jan. 11, 2012   (KR) .................. 10-2012-0003365
Feb. 28, 2012   (KR) .................. 10-2012-0020004

(51) Int. Cl.
*G06F 17/30* (2006.01)
(52) U.S. Cl.
CPC ................. *G06F 17/30905* (2013.01)
(58) Field of Classification Search
CPC .. G11B 27/34; G11B 27/034; H04N 5/44543; H04N 5/4401; H04N 21/4622
See application file for complete search history.

(56) References Cited

U.S. PATENT DOCUMENTS 5,821,926 A  * 10/1998  Arita .......................... 715/744
6,396,962 B1 *  5/2002  Haffey ....................... G06T 3/40
                                                           345/660

(Continued)

FOREIGN PATENT DOCUMENTS

CN       1337619 A    2/2002
CN     101617534 A   12/2009

(Continued)

OTHER PUBLICATIONS

Tolba O et al.: "Pure Java-Based Streaming MPEG Player", Proceedings of SPIE, S P I E—International Society for Optical Engineering, US, vol. 3528, Nov. 1, 1998, pp. 216-224. XP000905206.

(Continued)

*Primary Examiner* — Jeffrey A Gaffin
*Assistant Examiner* — Mandrita Brahmachari
(74) *Attorney, Agent, or Firm* — Birch, Stewart, Kolasch & Birch, LLP

(57) ABSTRACT

A multimedia device for performing at least one function and a method for controlling the multimedia device according to embodiments are discussed. A multimedia device for performing at least one function includes an interface module configured to receive a command signal while performing a first function from among the at least one function; a capture module configured to capture a screen image displayed according to the first function; an adjustment module configured to adjust at least one of a size and location of the captured screen image; and a controller configured to perform a second function if an application having the adjusted at least one of size and location is selected, wherein the application is used to control the multimedia device.

21 Claims, 42 Drawing Sheets

(56) References Cited

U.S. PATENT DOCUMENTS

| | | | |
|---|---|---|---|
| 6,983,424 B1* | 1/2006 | Dutta | 715/800 |
| 2004/0098754 A1* | 5/2004 | Vella et al. | 725/135 |
| 2006/0242584 A1* | 10/2006 | Johanson et al. | 715/738 |
| 2006/0265083 A1 | 11/2006 | Otsu et al. | |
| 2010/0066836 A1 | 3/2010 | Nakamura et al. | |
| 2010/0088598 A1 | 4/2010 | Lee et al. | |
| 2010/0169778 A1 | 7/2010 | Mundy et al. | |
| 2011/0075990 A1* | 3/2011 | Eyer | H04N 5/76 386/241 |
| 2011/0271197 A1* | 11/2011 | Jones et al. | 715/739 |
| 2012/0092439 A1* | 4/2012 | Mackie et al. | 348/14.06 |
| 2012/0260217 A1* | 10/2012 | Celebisoy | G06F 3/04815 715/836 |

FOREIGN PATENT DOCUMENTS

| | | |
|---|---|---|
| CN | 102171940 A | 8/2011 |
| JP | 2006-332771 A | 12/2006 |

OTHER PUBLICATIONS

Sshim J P et al: "Cellular mobile TV phone: Current status misconceptions", Wireless Telecommunications Symposiujm, 2008. WTS 2008, IEEE, Piscatawaym NJ, USA, Apr. 24, 2008 (Apr. 24, 2008), pp. 202-209, XP031275007, ISBN: 978-1-4244-1869-5*abstract *p. 202, left-hand column, line 16 p. 202, right-hand column, line 8*page 203, left-hand column, line 1 —p. 203, left-hand column, line 27*p. 207, right-hand column, line 38—p. 208, left hand column, line 17*.

* cited by examiner

FIG. 7

| Function | Application | |
|---|---|---|
| | Size | Location |
| A function | 10% reduction | First layer |
| B function | 5% reduction | Second layer |
| C function | 3% reduction | Third layer |
| ⋮ | ⋮ | |

FIG. 8

| Function | Application | |
|---|---|---|
| | Size | Location |
| D function | larger than general App. | First group |
| E function | identical to general App. | Second group |
| F function | smaller than general App. | Third group |
| ⋮ | ⋮ | |

GENERATING USER SPECIFIC APPLICATIONS FOR PERFORMING FUNCTIONS IN A USER DEVICE AND METHOD FOR CONTROLLING THE SAME

This application claims priority to and the benefit of Korean Patent Application No. 10-2012-0003365, filed on Jan. 11, 2012 and 10-2012-0020004 filed on Feb. 28, 2012, which are hereby incorporated by reference as if fully set forth herein.

BACKGROUND OF THE INVENTION

Field of the Invention

Embodiments of the invention relate to a computing device technology, and more particularly, to a computing device for performing at least one function and a method for controlling the same. For example, the computing device can be applied to a network TV, a smart TV, an Internet TV, an Internet Protocol Television (IPTV), a web TV, a mobile device, or a smart phone.

Discussion of the Related Art

With development of information communication technologies, various devices capable of performing multiple functions have been developed and introduced to the market. While the multi-functional computing devices according to technical environments provide affirmative aspects to users, some functions from among several hundreds or thousands of functions are not used at all.

In addition, using a hot button or a bookmark menu (also called a favorite menu), a user can pre-register a desired function and then access the registered function in the future.

However, the conventional multi-functional computing device has a disadvantage in that the user must click on a plurality of depths to establish a hot button for a specific function desired by the user.

Further, even when using the bookmark function, the user must carry out inconvenient processes to enter the bookmark item, resulting in unnecessary time consumption.

In addition, functions capable of being added to the bookmark list or the list of hot buttons were greatly limited and classified according to individual groups, such that the user must remember the functions, resulting in greater inconvenience in use.

Finally, the related art has provided text-format options contained in the bookmark item, such that there is a need to develop a solution for more visually displaying user-desired items.

SUMMARY OF THE INVENTION

Accordingly, the embodiments of the invention are directed to a multimedia device for performing at least one function and a method for controlling the same that substantially obviate one or more problems due to limitations and disadvantages of the related art.

An embodiment of the invention is to provide a new solution for more quickly providing a shortcut function to a user who uses a multimedia device.

Another embodiment of the invention is to define a protocol to which a shortcut item can be added, irrespective of types of multiple functions provided from the computing device.

Another embodiment of the invention is to provide a technology for automatically recognizing a path of a shortcut service according to functions of a current multimedia device.

Another embodiment of the invention is to provide a multimedia device which, if a user points at a predetermined item, button, and the like, provides additional information or functions related (or linked) to the corresponding item, button, etc., such that the user can quickly and easily access desired or necessary information using the additional information or functions.

Another embodiment of the invention is to provide a new interface concept which provides a plurality of users utilizing a computing device with personalization page(s) as a customized service, such that each user can easily and quickly access their personalization page(s).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing at least one function in a multimedia device includes receiving a digital signal including audio and video data from a content provider; displaying the video data in a first region of a screen as a screen image; capturing the displayed screen image; displaying at least one option for mapping to the captured screen image in a second region of the screen; storing the captured screen image and a specific option, wherein the captured screen image is mapped to the specific option; generating an application for controlling the multimedia device based on the stored screen image and the specific option; and performing a specific function corresponding to the specific option if the generated application is selected.

In another aspect of the invention, a multimedia device for performing at least one function includes an interface module configured to receive a command signal while performing a first function from among the at least one function; a capture module configured to capture a screen image displayed according to the first function; an adjustment module configured to adjust at least one of a size and location of the captured screen image; and a controller configured to perform a second function if an application having the adjusted at least one of size and location is selected, wherein the application is used to control the multimedia device.

In another aspect of the invention, a method for performing at least one function in a multimedia device includes receiving a command signal while performing a first function from among the at least one function; capturing a screen image displayed according to the first function; adjusting at least one of a size and location of the captured screen image; displaying a list including a graphic indicator representing at least one application stored in a memory and a specific application having the adjusted at least one of size and location, wherein the specific application is used to control the multimedia device; and performing a second function if the specific application within the list is selected.

It is to be understood that both the foregoing general description and the following detailed description of the invention are example and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

FIG. 7 is a view illustrating a database for carrying out a capture function according to an embodiment of the invention.

FIG. 8 is a view illustrating a database for carrying out a capture function according to another embodiment of the invention.

DETAILED DESCRIPTION OF THE INVENTION

Figure 1:
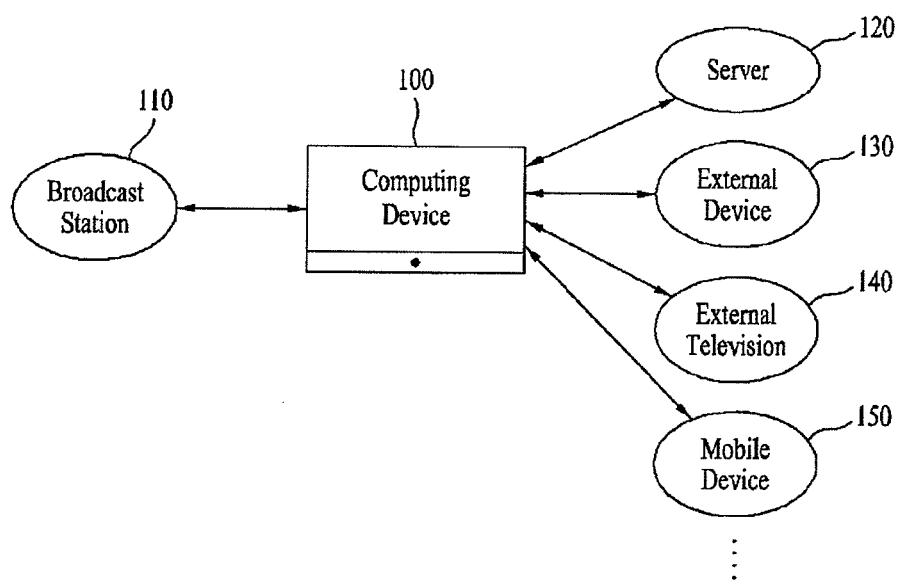
FIG. 1 is a conceptual diagram illustrating an entire system including a computing device according to an embodiment of the invention.

Reference will now be made in detail to the embodiments of the invention, examples of which are illustrated in the accompanying drawings. Wherever possible, the same reference numbers will be used throughout the drawings to refer to the same or like parts.

The words "module" and "unit", which are appended to terms describing components, are simply used for ease of explanation of the invention and thus may be used interchangeably.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

The term "input means" may include all kinds of devices connected to the aforementioned computing devices (for example, a general remote controller, a mouse, a pointer, a pointing device, etc.) so as to transmit/receive data and signals (including a control signal). Meanwhile, a smartphone, a tablet PC, or the like can also be used as an input means of the invention. In the invention, if a pointer of an input means is pointed (or rolled over) at a user interface (UI) such as a predetermined item or button of the computing device, the UI such as a predetermined item or button may be changed. For example, the changed UI may include predetermined additional information, additional functions, etc., in consideration of the conventional UI attributes. Size, color, shape, location, etc., of the UI are changed, such that the fact that the corresponding UE was pointed or selected can be more easily recognized and additional information or functions can also be easily carried out.

The term "family menu" refers to a user interface (UI) for convenient use by each user on the condition that one computing device is used by a plurality of users. For example, if each user who uses the computing device stores at least one personalization page composed of user-customized or personalized styles according to user interests, the computing device can access one or more personalization pages for each user through the above-mentioned family menu or a separate interface (to be described later). Meanwhile, the user can provide not only a personalization page but also other pages similar to the personalization page through the family menu. For example, the page similar to the personalization page may further include a control page for controlling a variety of digital devices connected to a home network. For example, the personalization page may include a predetermined menu, a constituent item of the menu, and all UIs capable of being provided through the computing device. Meanwhile, the computing device according to the invention can define and provide a new interface, such that it can more easily and conveniently recognize access to a per-user personalization page contained in the family menu, and movement or change between personalization pages, thereby providing a visual effect to the user. A detailed description thereof will be described later.

The solution for defining a captured image using a new application will hereinafter be described with reference to FIGS. 1 to 30. The user interface (UI) using a personalization page will hereinafter be described with reference to FIGS. 31 to 41. Of course, those skilled in the art may also implement other embodiments by aggregating individual drawings without departing from the scope or spirit of the invention.

FIG. 1 is a conceptual diagram illustrating an entire system including a computing device (or a multimedia device) according to an embodiment of the invention. The entire system including the computing device according to one embodiment of the invention will hereinafter be described with reference to FIG. 1.

Referring to FIG. 1, the entire system includes a computing device (or a multimedia device) 100, a broadcast station 110, a server 120, an external device 130, a external television (TV) 140, a mobile device 150, etc. The computing device according to one embodiment of the invention may be connected to the broadcast station 110 through terrestrial-, cable-, or satellite-communication, or may also be connected thereto over a network such as the Internet.

Meanwhile, the computing device 100 is connected to the server 120 by wire or wirelessly, and the external device 130 may be, for example, a USB memory, a Hard Disk Drive (HDD), or the like. Further, the external TV 140 and the mobile device 150 are spaced apart from the computing device 100 and can communicate with the computing device 100. For example, the external TV 140 and the mobile device 150 may be designed to place a phone call to the computing device 100.

Especially, if a user finds a preferred channel, a program, and a specific function during TV viewing or execution of a general TV function, the computing device 100 according to one embodiment of the invention captures the corresponding screen image and generates a unique application for the user.

In more detail, if a user who views a TV selects a capture button, the computing device 100 automatically generates a unique application by capturing the selected screen image. In accordance with one characteristic of the invention, if a plurality of mapping functions is employed, the computing device can provide at least one option capable of being selected by the user.

Further, during execution of a general TV function, if the capture button according to one embodiment of the invention is selected, an application capable of immediately carrying out the corresponding function is generated. Therefore, assuming that the user selects a newly generated application without using a complicated depth navigation, a current display state jumps to the captured screen image or the corresponding function.

Figure 2:
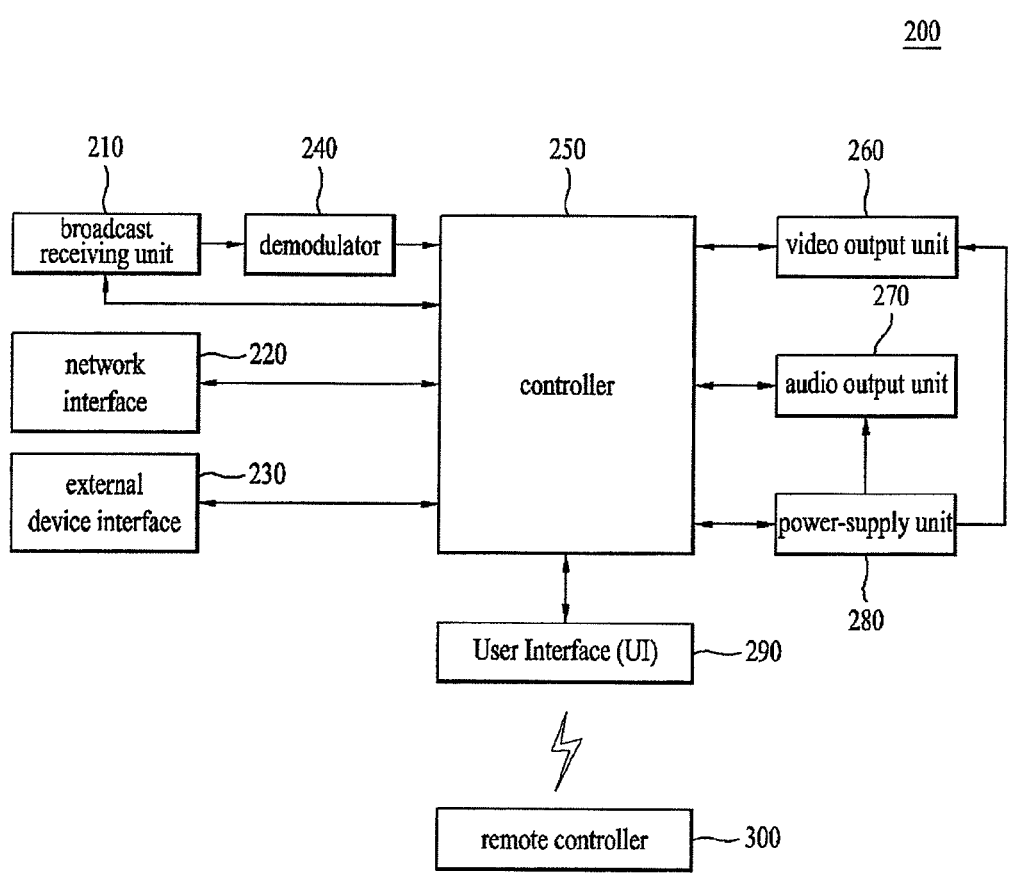
FIG. 2 is a block diagram illustrating a computing device according to an embodiment of the invention.

FIG. 2 is a block diagram illustrating a computing device according to an embodiment of the invention. The computing device according to one embodiment of the invention will hereinafter be described with reference to FIG. 2.

Referring to FIG. 2, the computing device according to an embodiment of the invention may include a broadcast receiving unit 210, a demodulator 240, a network interface 220, an external device interface 230, a controller 250, a video output unit 260, an audio output unit 270, a power-supply unit 280, a user interface (UI) unit 290, etc. Meanwhile, the computing device 200 is designed to communicate with the remote controller 300, and a detailed description of the remote controller 300 will be described later with reference to FIGS. 5 and 6.

The broadcast receiving unit 210 may be designed as a radio frequency (RF) tuner, or may also be designed as an interface for receiving broadcast data from an external device. The broadcast receiving unit 210 may receive an RF broadcast signal of a single carrier according to an Advanced Television Systems Committee (ATSC) scheme or RF broadcast signals of multiple carriers according to a Digital Video Broadcasting (DVB) scheme.

The demodulator 240 receives and demodulates a digital IF signal converted by the broadcast receiving unit 201. For example, if the digital IF signal output from the broadcast receiving unit 210 is based on the ATSC scheme, the demodulator 240 performs, for example, 8-vestigal side band (8-VSB) demodulation.

The external device interface unit 230 enables data communication between an external device and the computing device 200. The external device interface unit 230 may be connected to an external device, such as a digital versatile disc (DVD) player, a Blu-ray disc (BD) player, a game console, a camera, a camcorder, a computer (laptop computer), or an STB, by wire or wirelessly.

The external device interface unit 230 may include, for example, a universal serial bus (USB) terminal, a composite video banking sync (CUBS) terminal, a component terminal, an S-video terminal (analog), a digital visual interface (DVI) terminal, a high definition multimedia interface (HDMI) terminal, a RGB terminal, and a D-SUB terminal.

The network interface unit 220 provides an interface for connecting the computing device 200 to a wired/wireless network including the Internet. The network interface unit 220 may include, for example, an Ethernet terminal for connection with a wired network. Also, the network interface unit 220 may use communication standards, such as wireless LAN (WLAN) (Wi-Fi), wireless broadband (Wi-Bro), world interoperability for microwave access (WiMax) and high speed downlink packet access (HSDPA) for connection with a wireless network.

The user interface unit 290 may transmit a signal input by a user to the controller 250 or may transmit a signal from the controller 250 to an external device (for example, the remote controller 300). For example, the user interface unit 290 is designed to receive and process a control signal, such as power on/off, channel selection, or screen setting, or to transmit a control signal from the control unit 206 to the remote controller 210, according to various communication modes, such as a radio frequency (RF) communication mode and an infrared (IR) communication mode.

A detailed description of the controller 250 will be described later with reference to FIGS. 3 and 4. The controller shown in FIGS. 3 and 4 may be implemented in different embodiments, or may also be implemented in one embodiment corresponding to a combination of FIGS. 3 and 4.

The video output unit 260 converts a video signal, a data signal, or an OSD signal processed by the controller 250 or a video signal or a data signal received by the external device interface unit 230 into red (R), green (G), and blue (B) signals to generate a drive signal. The audio output unit 270 receives a signal, such as a stereo signal, a 3.1 channel signal, or a 5.1 channel signal, audio-processed by the controller 250, and outputs the received signal as an audio.

The power-supply unit 280 supplies power to the computing device 200. In particular, the power-supply unit 280 may supply power to the controller 250, which may be configured in the form of a system on chip (SOC), the video output unit 260 for displaying video, and the audio output unit 270 for outputting audio.

Figure 3:
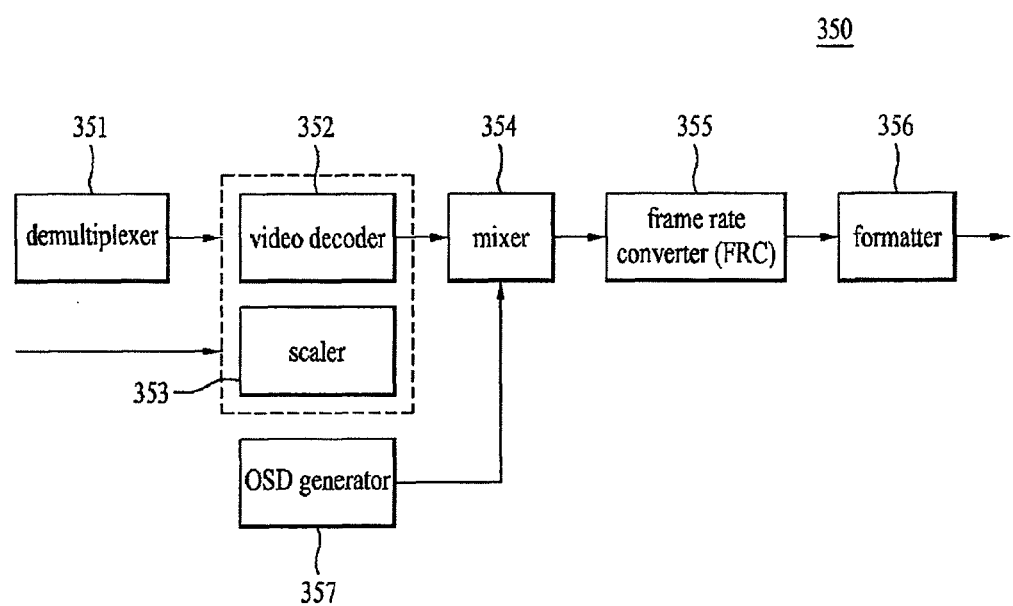
FIG. 3 is a detailed block diagram illustrating a controller shown in FIG. 2 according to an embodiment of the invention.

FIG. 3 is a detailed block diagram illustrating a controller shown in FIG. 2 according to an embodiment of the invention.

Referring to FIG. 3, the controller 350 for use in the computing device may include a demultiplexer 351, a video decoder 352, a scaler 353, an OSD generator 357, a mixer 354, a frame rate converter (FRC) 355, and a formatter 356. The controller 350 may further include an audio processor and a data processor.

The demultiplexer 351 demultiplexes an input stream. For example, when an MPEG-2 TS is input to the demultiplexer 351, the demultiplexer 351 demultiplexes the MPEG-2 TS into image, audio, and data signals.

The image decoder 352 decodes the demultiplexed image signal and the scaler 353 scales the decoded image signal to allow the video output unit to output the decoded image signal.

The OSD generator 357 generates an OSD signal according to user input or automatically. Therefore, the mixer 354 may mix the OSD signal generated by the OSD generator 357 and the decoded image signal produced through image processing by the image processing units 352 and 353.

The frame rate converter (FRC) 355 may convert the frame rate of an input image. For example, a frame rate of 60 Hz is converted into a frame rate of 120 or 240 Hz.

The formatter 356 receives a signal output from the frame rate converter (FRC) 355, changes the format of the received signal so that the signal is suitable for the video output unit, and outputs the signal, the format of which has been changed. For example, R, G, and B data signals may be output. The R, G, and B data signals may be output as low voltage differential signaling (LVDS) or mini-LVDS.

Figure 4:
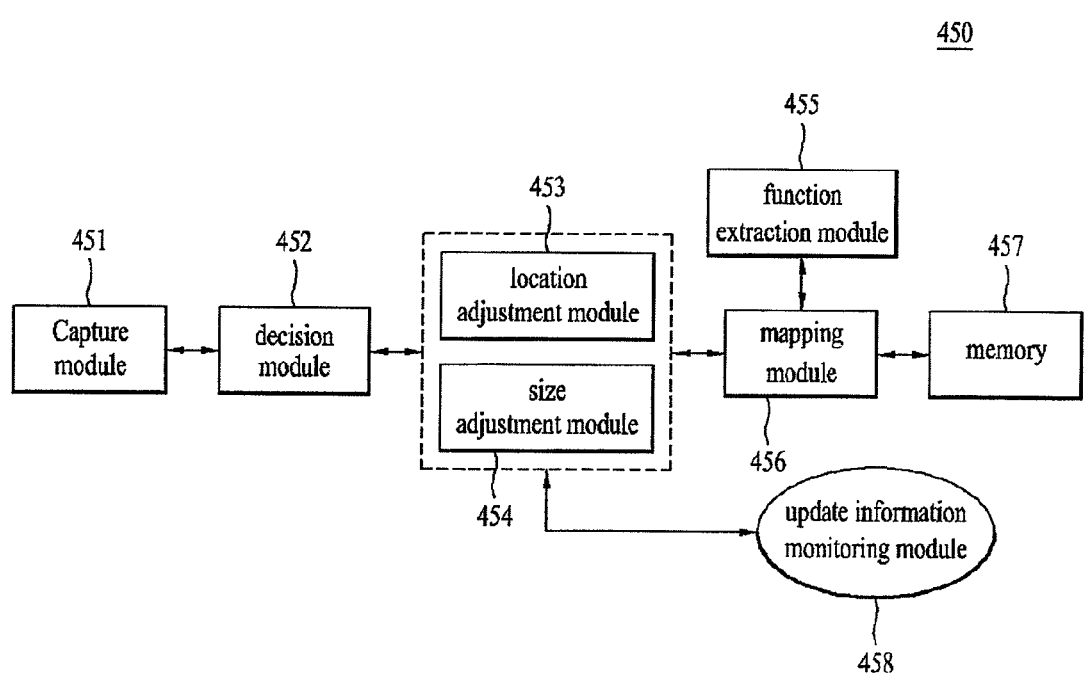
FIG. 4 is a detailed block diagram illustrating a controller shown in FIG. 2 according to another embodiment of the invention.

FIG. 4 is a detailed block diagram illustrating a controller shown in FIG. 2 according to another embodiment of the invention. The controller of FIG. 4 may be implemented to include the controller shown in FIG. 3, or may also be implemented independently of the controller shown in FIG. 3.

First of all, it is assumed that the computing device according to one embodiment of the invention performs a specific function from among at least one function. In this instance, the computing device 200 is designed to receive a command signal through the user interference unit 290 shown in FIG. 2. Here, the command signal may correspond to a command for initiating a capture function of the invention.

The capture module 451 shown in FIG. 4 is designed to capture an output screen image in response to activation of the specific function. For example, assuming that a function for outputting a channel number #11 is underway, a current screen image output from the channel #11 is captured.

The location adjustment module 453 and the size adjustment module 454 are used to adjust the size and location of the captured image. In addition, if an image having the adjusted size and location is selected using the remote controller 300 shown in FIG. 2, the controller 250 shown in FIG. 2 is controlled to carry out a function corresponding to any one of at least one metadata mapped to the above-mentioned image.

On the other hand, a decision module 452 shown in FIG. 4 is designed to determine a category (type) of the above-mentioned specific function. A calculation module changes the size and location of the captured image according to the decision module. For example, assuming that a currently executing function decided by a function extraction module 455 is a simple channel output image, the captured image is reduced in size by 10% and is located at a first layer. Assuming that the currently executing function is a screen ratio, the captured image is reduced in size by 50% and is located at a second layer. A detailed description thereof will be described later with reference to FIGS. 7 and 8.

The mapping module 456 maps an image having the adjusted size and location to a specific function decided by the function extraction module 455, thereby generating a new application. The generated application is stored in the memory 457. The update information monitoring module 458 determines the presence or absence of update information related to the application generated by the embodiment of the invention, and transmits the update information in real time. A detailed description thereof will be described later with reference to FIGS. 20 and 21.

For example, when receiving/outputting a first content from a first channel in response to the aforementioned specific function, if the user interface unit 290 receives the command signal, the controller 250 shown in FIG. 2 controls the video output unit 260 to display at least one option. A detailed description thereof will be described later with reference to FIG. 12.

In another example, if a first option from among at least one displayed option is selected, the controller 250 performs channel switching to the first channel. A detailed configuration thereof will be described later with reference to FIGS. 13A and 13B. If a second option from among at least one displayed option is selected, the controller 250 may access the selected option using a content provider (CP) which provides an additional service related to the first content. A detailed description will be given later with reference to FIGS. 14A and 14B. If a third option from among at least one displayed option is selected, the controller 250 controls the video output unit 260 to display some parts of the first content stored in the memory from the captured time. A detailed description thereof will be given with reference to FIGS. 15A and 15B.

The network interface 220 of the computing device according to one embodiment of the invention is designed to provide a video phone service to at least one user according to the specific function. If the video phone service is achieved through the network interface 220, the controller 250 extracts identification (ID) information corresponding to at least one user, and is designed to transmit a call signal using the extracted identification information. A detailed description thereof will be given with reference to FIGS. 16 and 17.

Figure 5:
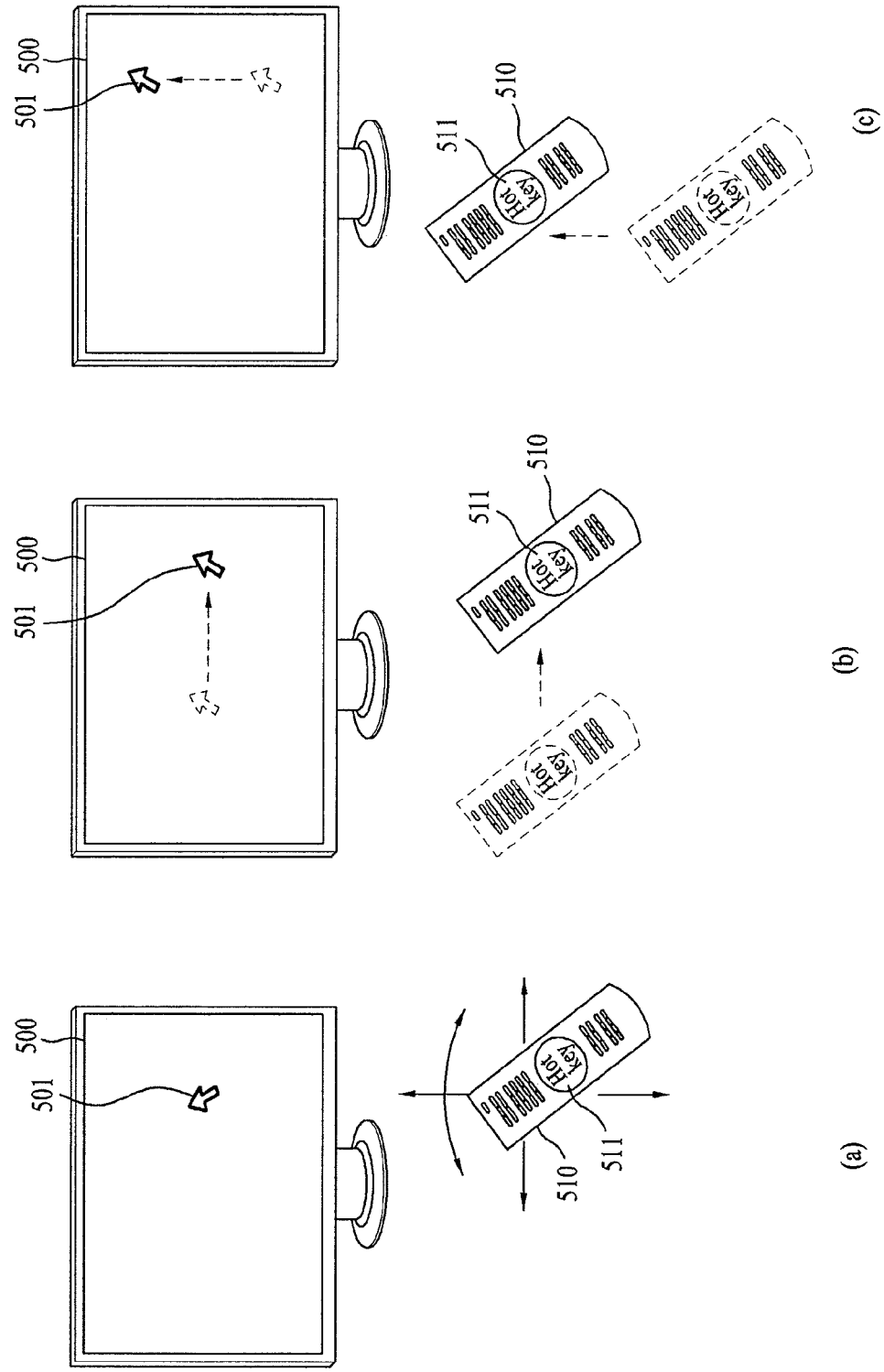
FIG. 5 is a view showing the external appearance of a remote controller for controlling a computing device at a remote site according to an embodiment of the invention.

FIG. 5 is a view showing the external appearance of a remote controller for controlling a computing device at a remote site according to an embodiment of the invention.

As shown in (a) of FIG. 5, a pointer (or cursor) 501 corresponding to motion of a remote controller 510 is displayed on a screen of the computing device 500. A user may move the remote controller 510 from side to side ((b) of FIG. 5) or upward and downward ((c) of FIG. 5), or may rotate the remote controller 510. The remote controller 510 may be referred to as a pointing device since the pointer 501 is moved and displayed according to the motion of the remote controller 510 in a three-dimensional (3D) space.

In accordance with the embodiment of the invention, it is necessary for the computing device 500 to quickly capture a necessary image under an arbitrary environment and a hot key 511 for performing the capture function may be added to the remote controller 510 by hardware.

When the user moves the remote controller 510 to the left as shown in (b) of FIG. 5, the pointer 501 displayed on the screen of the computing device 500 also moves to the left. Meanwhile, information regarding the motion of the remote controller 510 sensed by a sensor of the remote controller 510 is transmitted to the computing device 500. The computing device 500 may calculate coordinates of the pointer 501 from the information regarding the motion of the remote controller 510. The computing device 500 may display the pointer 501 so that the pointer 501 corresponds to the calculated coordinates.

On the other hand, when the user moves the remote controller 510 downward as shown in (c) of FIG. 5, the pointer 501 displayed on the screen of the computing device 500 also moves downward. Therefore, it is possible to rapidly select a specific region in the screen of the computing device 500 using the remote controller 510 according to the embodiment of the invention.

Figure 6:
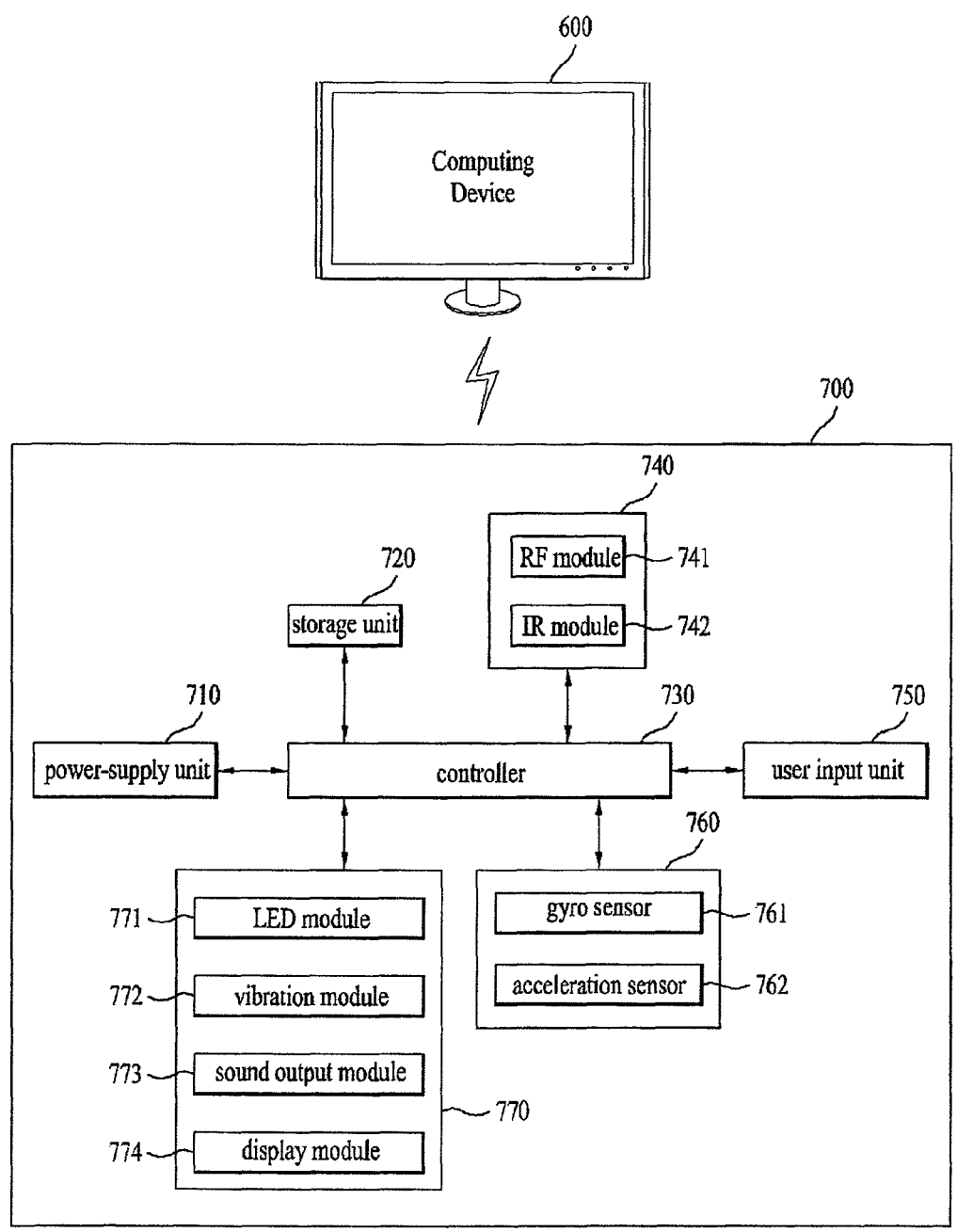
FIG. 6 is a block diagram illustrating internal constituent elements of the remote controller shown in FIG. 5.

FIG. 6 is a block diagram showing components of the remote controller shown in FIG. 5 in detail.

As shown in FIG. 6, the remote controller 700 includes a wireless communication unit 740, a user input unit 750, a sensor unit 760, an output unit 770, a power-supply unit 710, a storage unit 720, and a controller 730.

The wireless communication unit 740 is designed to communicate with an arbitrary external device.

In addition, according to the embodiment of the invention, the remote controller 700 transmits a signal containing information regarding the motion of the remote controller 700 to the computing device 600 via the RF module 741.

Also, the remote controller 700 may receive a signal transmitted from the computing device 600 via the RF module 741. Also, the remote controller 700 may transmit a command for power on/off, channel change, or volume change to the computing device 600 via the IR module 742, as needed.

The user input unit 750 may be realized by a keypad, a button, a touchpad, or a touchscreen.

The sensor unit 760 may include a gyro sensor 761 or an acceleration sensor 762. The gyro sensor 761 may sense information regarding the motion of the remote controller 700. For example, the gyro sensor 761 may sense information regarding the motion of the remote controller 700 on the basis of x, y, and z axes. The acceleration sensor 762 may sense information regarding velocity of the remote controller 700. Meanwhile, the sensor unit 760 may further include a distance measurement sensor for sensing the distance between the remote controller 700 and the computing device 600.

The output unit 770 may output a video or audio signal corresponding to manipulation of the user input unit 750 or a signal transmitted from the computing device 600. For example, the output unit 770 may include a light emitting diode (LED) module 771 configured to be driven when the user input unit 750 is manipulated or when a signal is transmitted and received between the remote controller 700 and the computing device 600 through the wireless communication unit 740, a vibration module 772 for generating vibration, a sound output module 773 for outputting a sound, or a display module 774 for outputting a video.

The power-supply unit 710 supplies power to the respective components of the remote controller 700. When the remote controller 700 is not moved for a predetermined time, the power-supply unit 710 may stop the supply of power to the remote controller 700 to reduce power consumption.

The storage unit 720 may store various kinds of programs necessary for control or motion of the remote controller 700 and application data. The controller 730 controls overall operations of the remote controller 700. For example, the control unit 730 may transmit a signal corresponding to predetermined key manipulation of the user input unit 750 or a signal corresponding to the motion of the remote controller 700 sensed by the sensor unit 770 to the computing device 600 through the wireless communication unit 740. A detailed description thereof will be described with reference to FIGS. 26 to 30.

FIG. 8 is a view illustrating a database (DB) for carrying out a capture function according to another embodiment of the invention. An example database needed for carrying out the capture function according to one embodiment of the invention will hereinafter be described with reference to FIG. 7.

In accordance with one characteristic of the invention, if the user presses the capture button during execution of an arbitrary function, an application represented as a captured image is automatically generated. As described above, the new application is mapped to a function that is being executed at a specific time at which the image is captured. Meanwhile, in accordance with another characteristic of the invention, the size and location contained in the application list are readjusted according to types of a function that is being executed.

For example, if the capture function is carried out during execution of the A-type function as shown in FIG. 7, the size of an application to be contained in the list is reduced by 10%, and the captured image is located at a first layer of the list. If the capture function is carried out during execution of the B-type function, the size of the application to be contained in the list is reduced by 5%, and the captured image is located at a second layer of the list. In addition, if the capture function is carried out during execution of the C-type function, the size of the application to be contained in the list is reduced by 3%, and the captured image is located at a third layer of the list.

FIG. 8 is a view illustrating a database for carrying out a capture function according to another embodiment of the invention. An example database needed for carrying out the capture function according to one embodiment of the invention will hereinafter be described with reference to FIG. 8.

For example, if the capture function is carried out during execution of the D-type function as shown in FIG. 8, the application to be contained in the list is resized to be larger than the general application, and is contained in a first group of the list. In addition, if the capture function is carried out during execution of the E-type function, the application to be contained in the list is resized to be identical to the general application, and is contained in a second group of the list. If the capture function is carried out during execution of the F-type function, the application to be contained in the list is resized to be smaller than the general application, and is contained in a third group of the list.

Therefore, as shown in FIG. 7 or 8, the size and location of the application are adjusted according to a state of the computing device, the capture function of which is executed, such that a more customized access function can be provided to the user. For example, if the capture function is carried out during viewing of a TV channel, the captured image can be resized to be larger than the general application, so that the user can easily recognize the resized image in a subsequent process. Further, a one-click access group for a channel and a one-click access group for a general TV function are displayed in different ways, such that a user can quickly check a desired application from among a large number of new applications to be continuously generated.

Figure 9A:
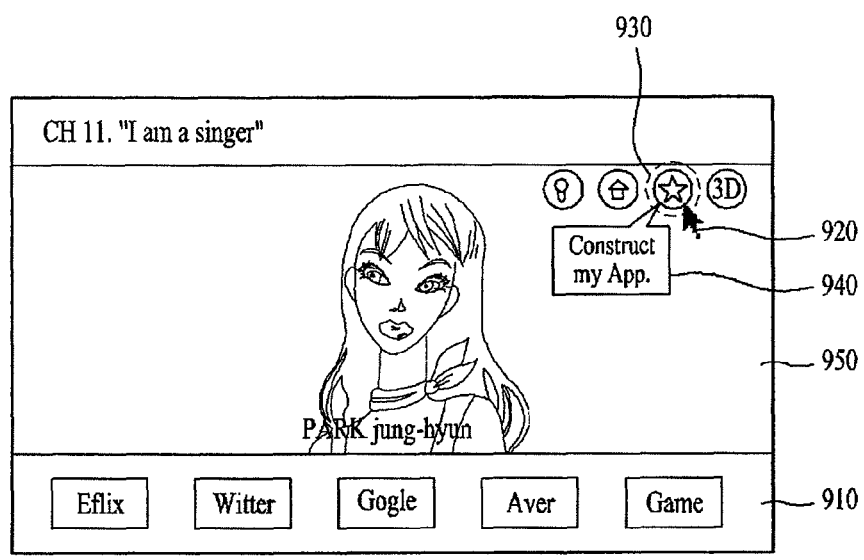
FIGS. 9A to 9C are views illustrating a procedure for activating the capture function while a user views an arbitrary channel.
Figure 9B:
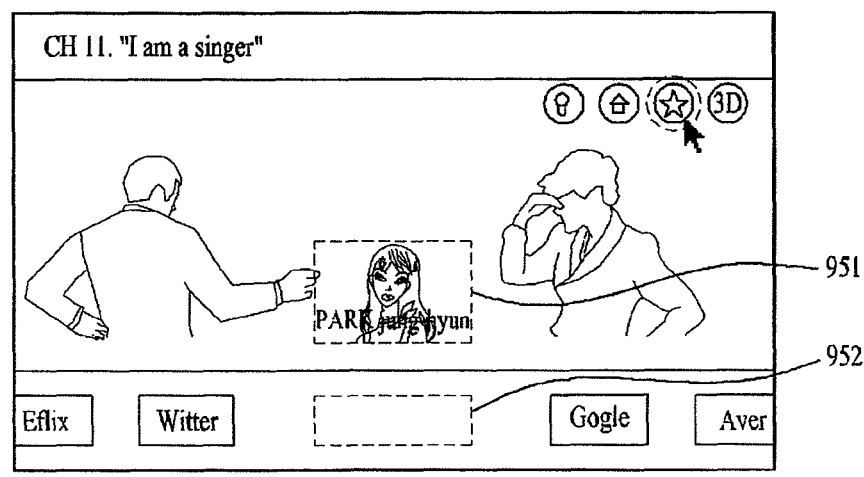
Figure 9C:
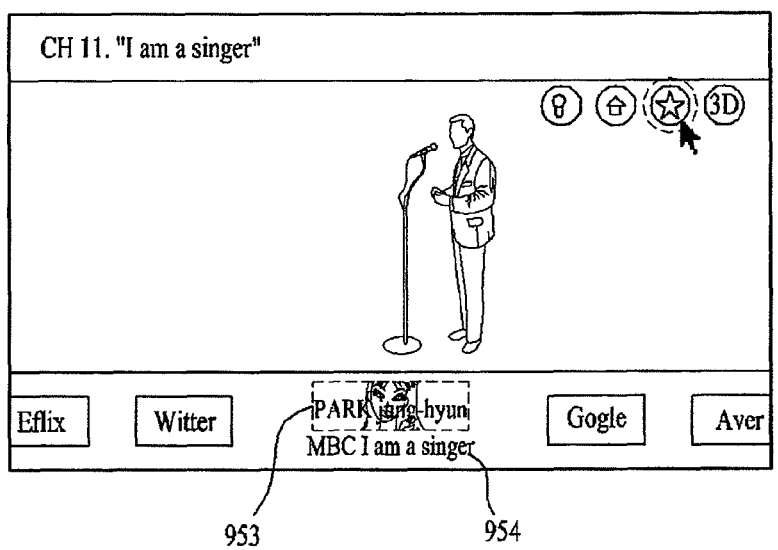

FIGS. 9A to 9C are views illustrating a procedure for activating the capture function while a user views an arbitrary channel.

First of all, as shown in FIG. 9A, it is assumed that a user who uses the computing device (for example, a network TV) views a channel #11. Therefore, content 950 (e.g., video) from the channel #11 is displayed on the screen.

In this instance, if the user attempts to generate a shortcut to a current viewing channel, the user moves the remote controller in such a manner that an indicator 920 is located in (or to) a capture function region 930. In addition, if the user clicks on the capture function region 930, a message 940 for directing a main function may be pre-displayed as needed. In contrast, an application list 910 of general applications pre-stored in the memory is displayed at a lower part of the screen.

If the user locates the indicator 920 in the capture function region 930 using the remote controller and transmits a confirmation signal, a current screen image is changed to a new screen image shown in FIG. 9B.

That is, the image 951 of the channel #11 captured when the user transmits a confirmation signal is ready to move to a predetermined region 952 of the application list 910 as shown in FIG. 9B. As shown in FIG. 9C, the captured image 953 of the channel #11 can be automatically arranged in a predetermined region 954 of the channel list.

Figure 10A:
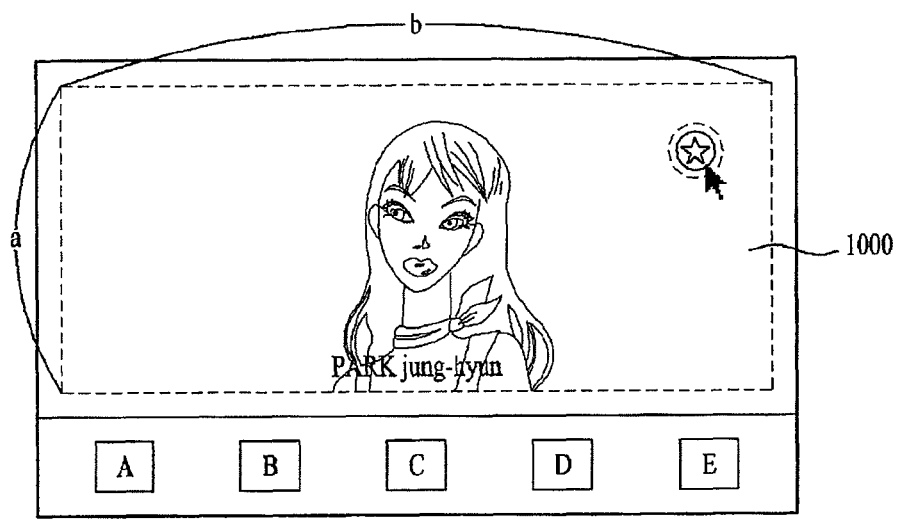
FIGS. 10A to 10C are views illustrating a procedure for moving the captured image.
Figure 10B:
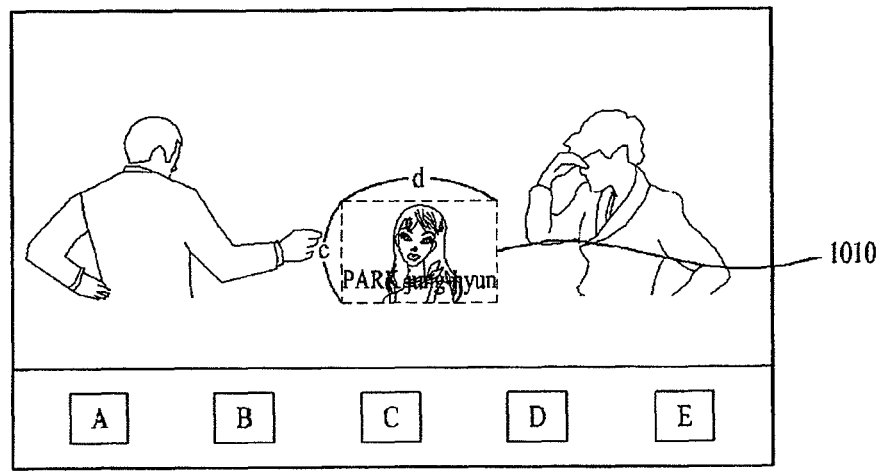
Figure 10C:
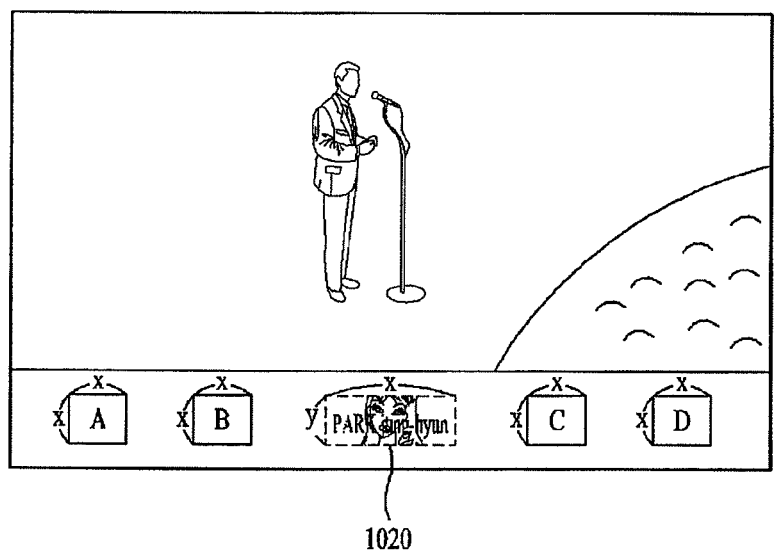

FIGS. 10A to 10C are views illustrating a procedure for moving the captured image.

If a capture function region or a capture button is confirmed as shown in FIG. 9A, a current channel screen image 1000 being viewed by the user is automatically captured (See FIG. 10A). In this instance, the initially captured image data has a length 'a' on a vertical axis whereas it has a length 'b' on a horizontal axis.

Meanwhile, when the captured image moves to the application list, the captured image is changed to a relatively reduced image 1010 as shown in FIG. 10B. Finally, if the captured image is contained in the application list, the captured image is changed to another image similar in size to a general application contained in the application list as shown in FIG. 10C. However, if the user captures a predetermined channel broadcast image and attempts to establish a shortcut function to the captured image, it is necessary for the captured image to be relatively larger than the general application. Differently from applications manufactured/distributed by companies, the inventive application manually manufactured by the user need to be identified as a captured image. Of course, information (e.g., a channel number, a content name, etc.) regarding the shortcut function mapped to a new application may also be displayed without departing from the scope or spirit of the invention.

Figure 11A:
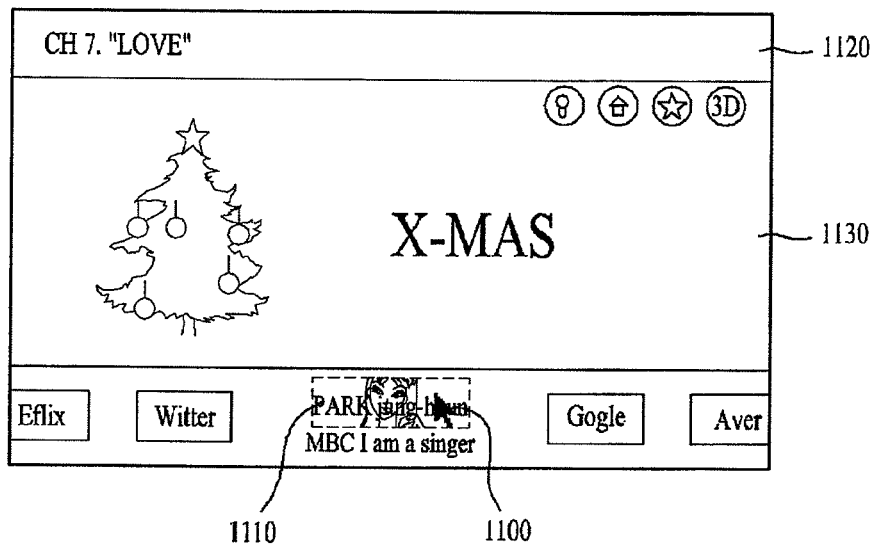
FIGS. 11A and 11B are views illustrating a procedure for executing applications according to an embodiment of the invention.
Figure 11B:
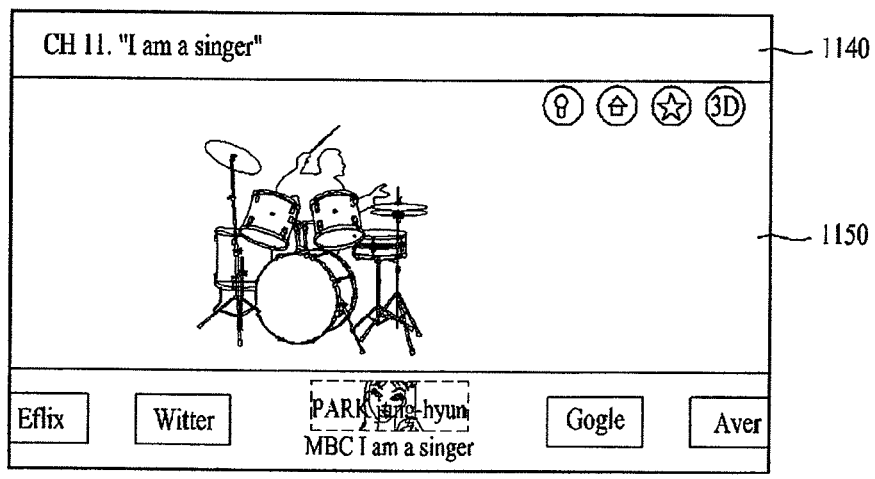

FIGS. 11A and 11B are views illustrating a procedure for executing applications according to an embodiment of the invention. As can be seen from FIGS. 9 and 10, it is assumed that a specific image is captured by the user so that a unique (or user-specific) application is created.

For example, if the user selects a broadcast program entitled "LOVE" 1120 on channel #7 as shown in FIG. 11A, the corresponding video data 1130 is displayed on the screen. In this instance, it is also assumed that the user desires to view the broadcast program "I am a singer" from a Munhwa Broadcasting Corporation (MBC) station.

Differently from the related art, if the user selects a unique application 1110 displayed as a captured image from among the application list using the indicator 1100 moving in response to movement of the remote controller, the user can conveniently view a desired program.

Therefore, when the user selects a specific application displayed as the captured image, a current screen image is changed to another screen image corresponding to "I am a singer" 1140 on channel #11 (MBC channel) as shown in FIG. 11B, such that the corresponding program 1150 is displayed on the screen. However, if the user performs the capture function when viewing an arbitrary channel, it is impossible to correctly predict whether user intention is to establish a quick function for a channel, to establish a quick function for content, or to establish a quick function for memory storage, any one of the quick functions may be defined as a default value. Of course, an option menu can also be provided to the user as needed, and a detailed description thereof will hereinafter be described with reference to the drawings starting from FIG. 12.

Figure 12:
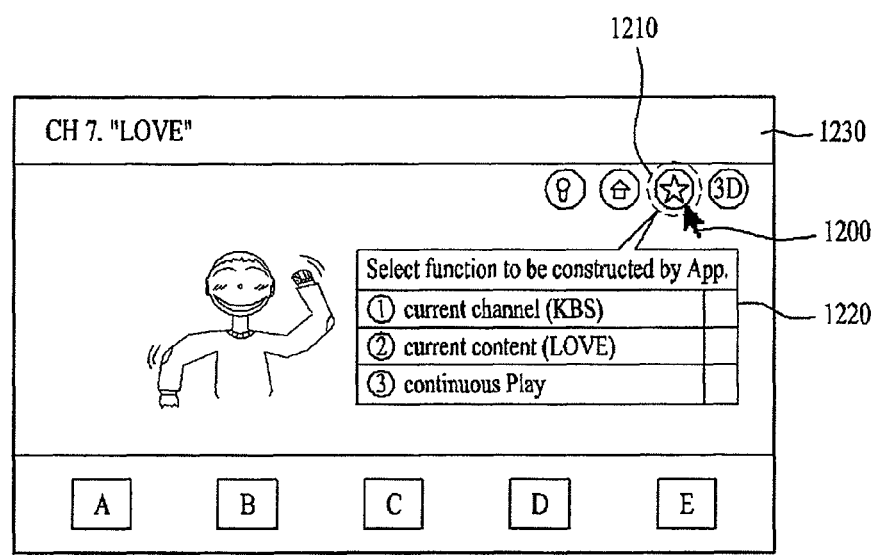
FIG. 12 is a view illustrating the list of options for selecting a specific function from among a plurality of functions on the condition that a capture function is activated.

FIG. 12 is a view illustrating the list of options for selecting a specific function from among a plurality of functions on the condition that a capture function is activated.

In accordance with one embodiment of the invention, it is assumed that the user who uses the computing device currently views the broadcast program entitled "LOVE" 1230 of channel #7. In this instance, if the user locates the indicator 1200 in the capture button region 1210 using the remote controller, all the options 1220 capable of being generated as the application are provided as shown in FIG. 12. Individual options will hereinafter be described with reference to FIGS. 13 to 15.

Figure 13A:
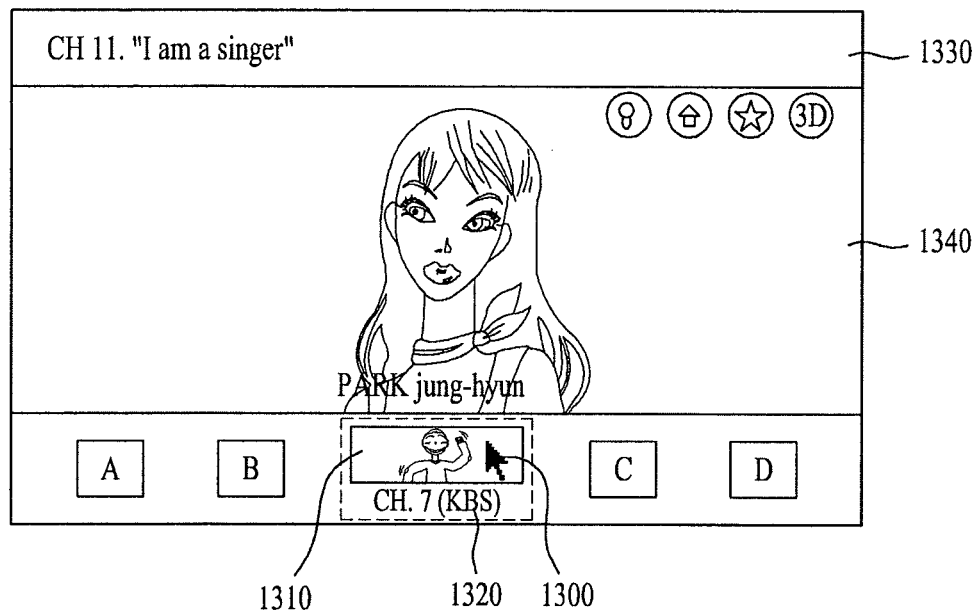
FIGS. 13A and 13B are views illustrating a procedure for mapping a current channel to an application when a first option from among the option list shown in FIG. 12 is selected.
Figure 13B:
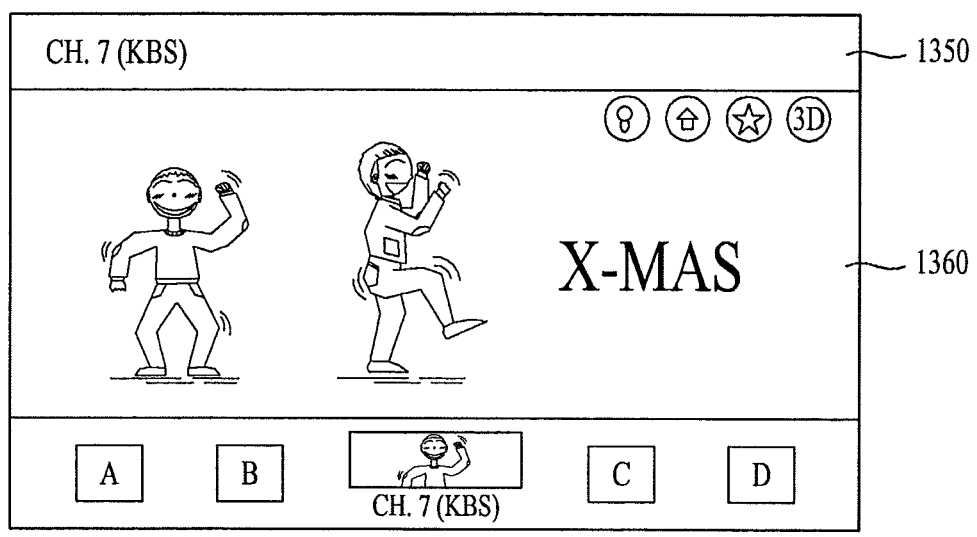

FIGS. 13A and 13B are views illustrating a procedure for mapping a current channel to an application when a first option from among the option list shown in FIG. 12 is selected.

If a current channel from among the option list 1220 shown in FIG. 12 is mapped to a new application, not only the captured image 1310 but also the channel information 1320 obtained when the image is captured is contained in the application list.

In addition, the user who performs channel switching to another channel #11 (1330) can view the current broadcast program 1340 output from the channel #11. In accordance with one characteristic of the invention, if the application displayed as the captured image 1310 is executed using the indicator 1300, a current display image is changed to another screen image shown in FIG. 13B.

That is, since the application displayed as the captured image is mapped to the channel switching function for the channel #7, a current broadcast program 1360 from the channel #7 (1350) is displayed as shown in FIG. 13B. When constructing the application using the captured image, the user gives priority to a channel obtained when the image is captured, instead of the content, so that the current broadcast program 1360 of the channel #7 (1350) can be displayed as shown in FIG. 13B.

Figure 14A:
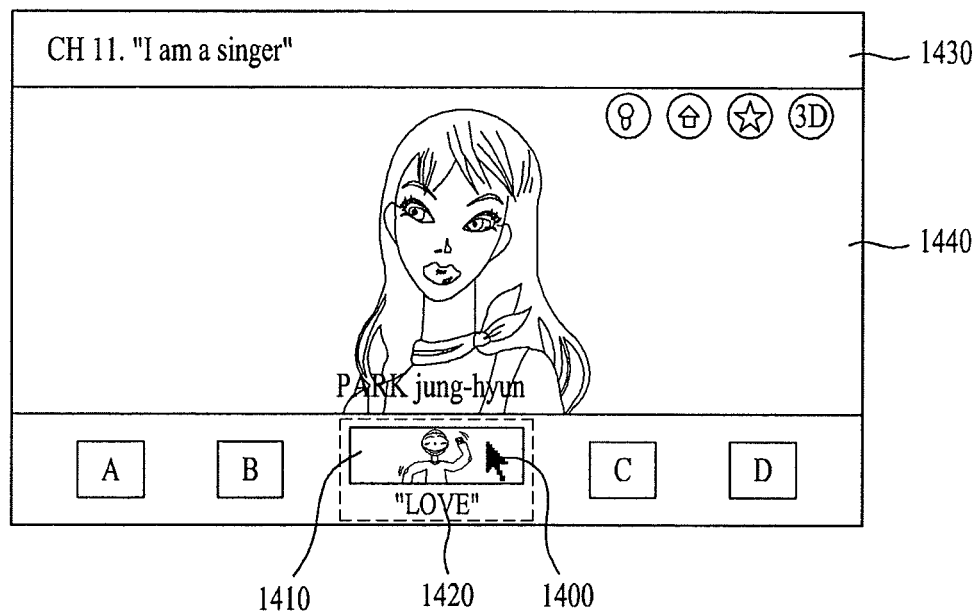
FIGS. 14A and 14B are views illustrating a procedure for mapping current content to an application when a second option from among the option list shown in FIG. 12 is selected.
Figure 14B:
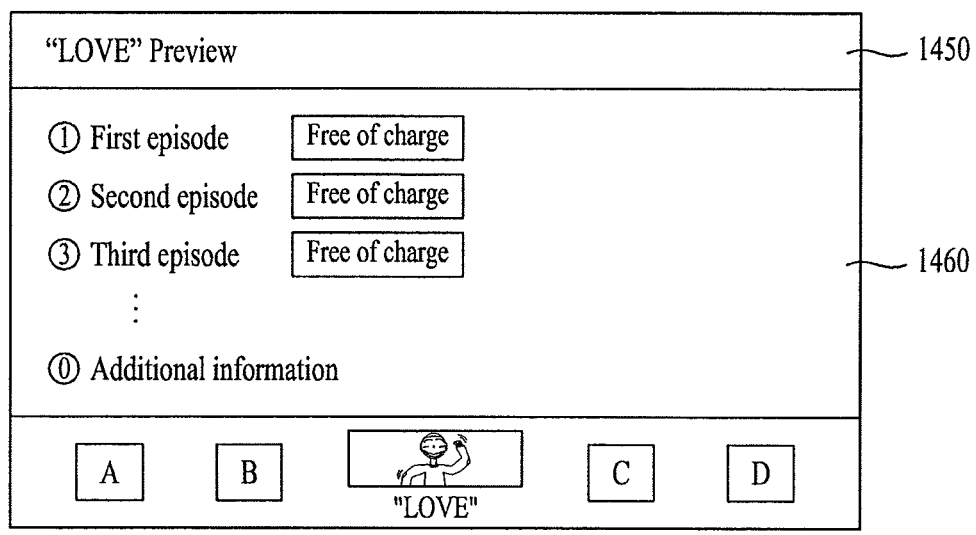

FIGS. 14A and 14B are views illustrating a procedure for mapping a current content to an application when a second option from among the option list shown in FIG. 12 is selected.

If currently viewed content from among the option list 1220 shown in FIG. 12 is mapped to a new application, not only the captured image 1410 but also the content information 1420 obtained when the image is captured is contained in the application list.

In addition, the user who performs channel switching to another channel #11 (1430) can view the current broadcast program 1440 output from the channel #11. In accordance with one characteristic of the invention, if the application displayed as the captured image 1410 is carried out using the indicator 1400, a currently displayed image is changed to another screen image shown in FIG. 14B.

That is, since the application displayed as the captured image is mapped to a function for accessing a content provider (CP) providing the broadcast program entitled "LOVE", a review service 1450 of the broadcast program "LOVE" is displayed as shown in FIG. 14B. For example, each episode is displayed in the form of a list 1460. Alternatively, the above-mentioned application may be directly connected to a website providing the broadcast program "LOVE". In more detail, when constructing the application using the captured image, the user gives priority to content obtained when the image is captured, instead of the channel, so that the preview service 1450 of the broadcast program can be displayed as shown in FIG. 14B, in this embodiment.

Figure 15A:
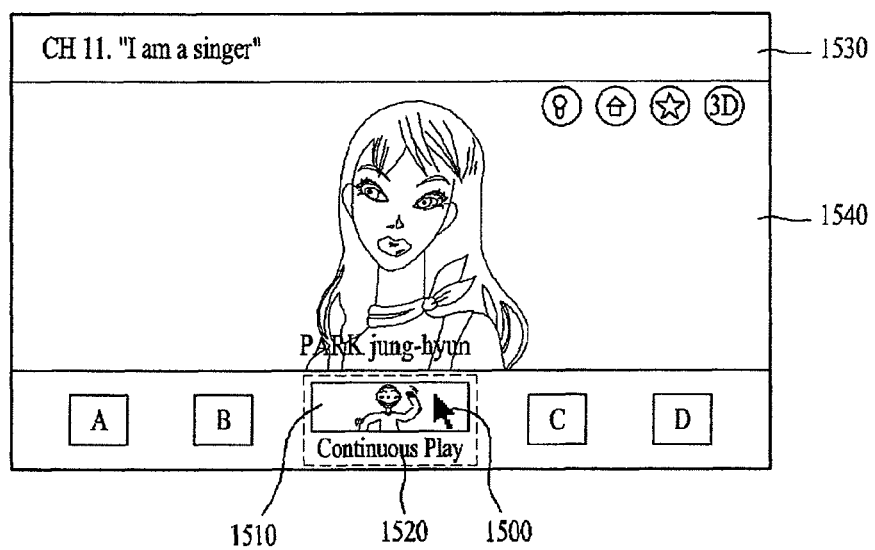
FIGS. 15A and 15B are views illustrating a procedure for mapping a continuous play function to an application when a third option from among the option list shown in FIG. 2 is selected.
Figure 15B:
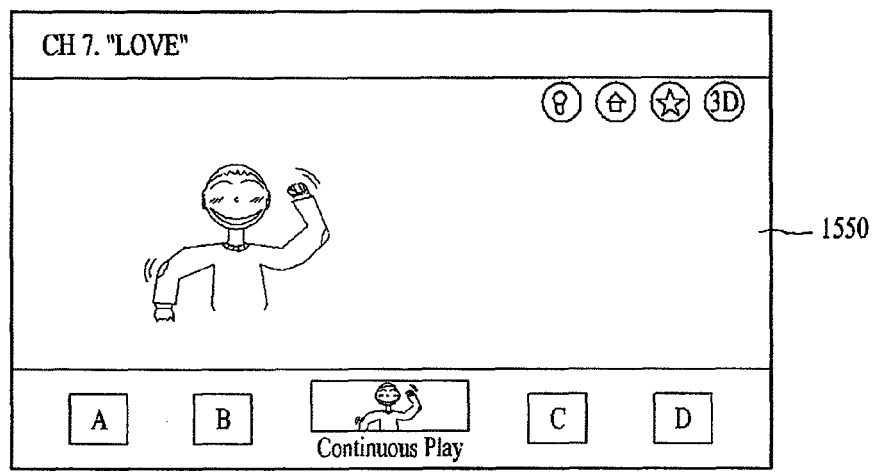

FIGS. 15A and 15B are views illustrating a procedure for mapping a continuous play function to an application when a third option from among the option list shown in FIG. 2 is selected.

If a continuous play function from among the option list 1220 shown in FIG. 12 is mapped to a new application, not only the captured image 1510 but also text information 1520 for directing the continuous play function is contained in the application list.

In addition, the user who performs channel switching to another channel #11 (1530) can view the current broadcast program 1540 output from the channel #11. In accordance with one characteristic of the invention, if the application displayed as the captured image 1510 is carried out using the indicator 1500, a current display image is changed to another screen image shown in FIG. 15B. On the other hand, when generating the application using the capture function, if the "continuous play" function is mapped to the application, content of the corresponding channel is automatically stored in the memory from a specific time when the image is captured.

That is, since the application displayed as the captured image is mapped to the continuous play function, the broadcast program "LOVE" of the channel #7 recorded from the start time of the image capturing is continuously displayed as shown in FIG. 15B. Therefore, provided that the user activates only the capture function according to one embodiment of the invention, although the user changes to another channel, the user can view again the corresponding channel without any problems. In addition, the image captured before channel switching is displayed on the list through the application, such that the problem that the user may forget the presence of a recorded program by mistake can be prevented from occurring.

Figure 16A:
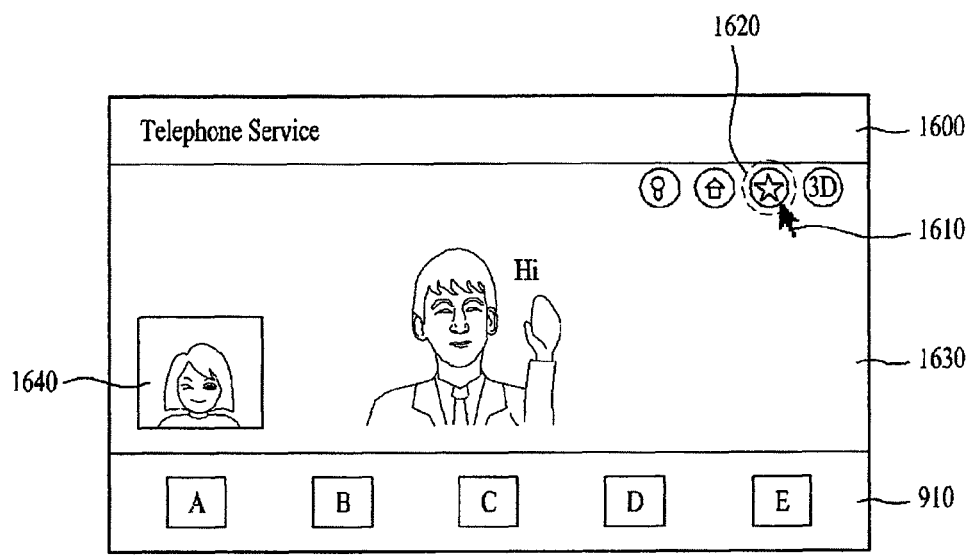
FIGS. 16A and 16B are views illustrating a procedure for mapping a video communication service to an application.
Figure 16B:
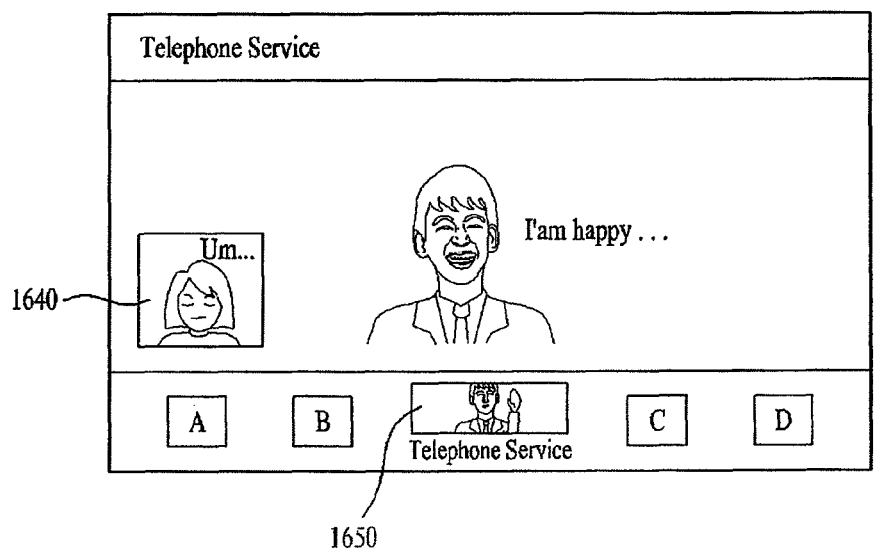

FIGS. 16A and 16B are views illustrating a procedure for mapping a video communication service to an application.

In recent times, the network TV can establish a video communication service with another party located at a remote site. However, with development of the network technology, the number of other parties for which the video communication service is possible may rapidly increase, but the user must memorize phone numbers and must manually search for the other party, resulting in greater user inconvenience.

For example, it is assumed that the computing device provides the video communication service 1600 as shown in FIG. 16A. A face of the user who uses the computing device is generally displayed at a left lower part 1640 shown in FIG. 16A, and the face of the counterpart occupies the full screen 1630. In this instance, the user clicks on the capture button 1620 using the indicator 1610 corresponding to movement of the remote controller.

Therefore, the computing device according to one embodiment of the invention maps identification information of the counterpart who uses a video communication service to the captured counterpart image, a new application 1650 is generated as shown in FIG. 16B. Two embodiments can be used as the solution for capturing the counterpart image. It may be possible to use a first embodiment in which the full screen is completely captured when the user selects the capture button, or it may be possible to use a second embodiment in which peripheral parts of the captured image is automatically cropped and only a center part of the capture image is stored because the counterpart image is located at the center region.

In addition, the user who confirms the captured image of the application shown in FIG. 16B can more clearly recognize who the counterpart is by viewing a face image of the counterpart.

Figure 17A:
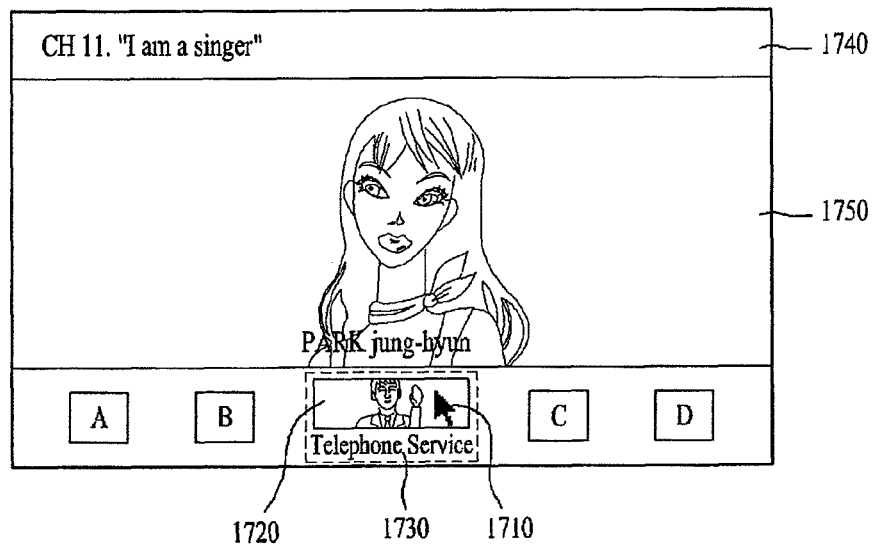
FIGS. 17A to 17C are views illustrating a procedure for activating an application generated by the embodiment of FIG. 16.
Figure 17B:
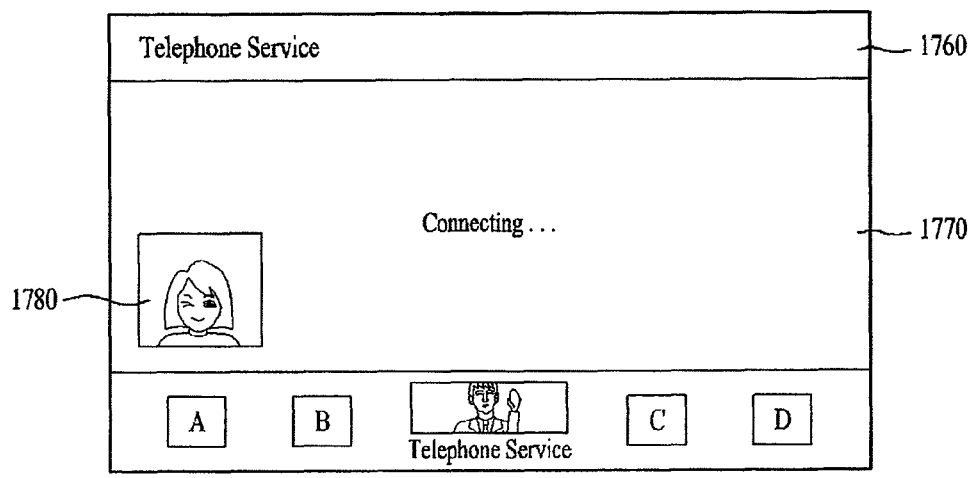
Figure 17C:
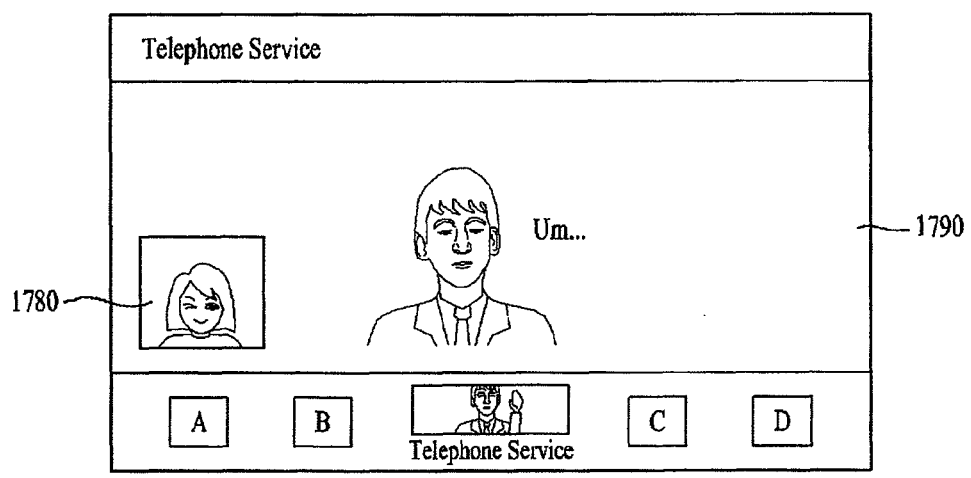

FIGS. 17A to 17C are views illustrating a procedure for activating an application generated by the embodiment of FIGS. 16A and 16B.

First of all, as shown in FIG. 17A, it is assumed that the application including the captured image 1720 and the message 1730 for directing the telephone service is contained in the list. It is also assumed that the user who views the content 1750 of the channel #11 (1740) using the computing device confirms the captured image of the application list and attempts to make a phone call to the counterpart of the captured image. To accomplish this, the user must locate the indicator 1710 at the captured image 1720.

Further, as shown in FIG. 17B, a current mode is switched to the telephone service mode 1760, the user image 1780 captured by the camera for use in the video communication service is displayed in the first region, and a message indicating a call-connecting state is displayed on the full screen image 1770. In addition, a calling signal is transmitted to a counterpart identification number mapped to the application of the captured image.

As shown in FIG. 17C, the counterpart (i.e., the called party) answers the calling signal, the current captured image 1790 of the called party is displayed on the full screen image, such that the problem that the user must directly memorize phone numbers of the counterparts for video telephone or must manually search for a desired phone number can be eliminated.

Figure 18A:
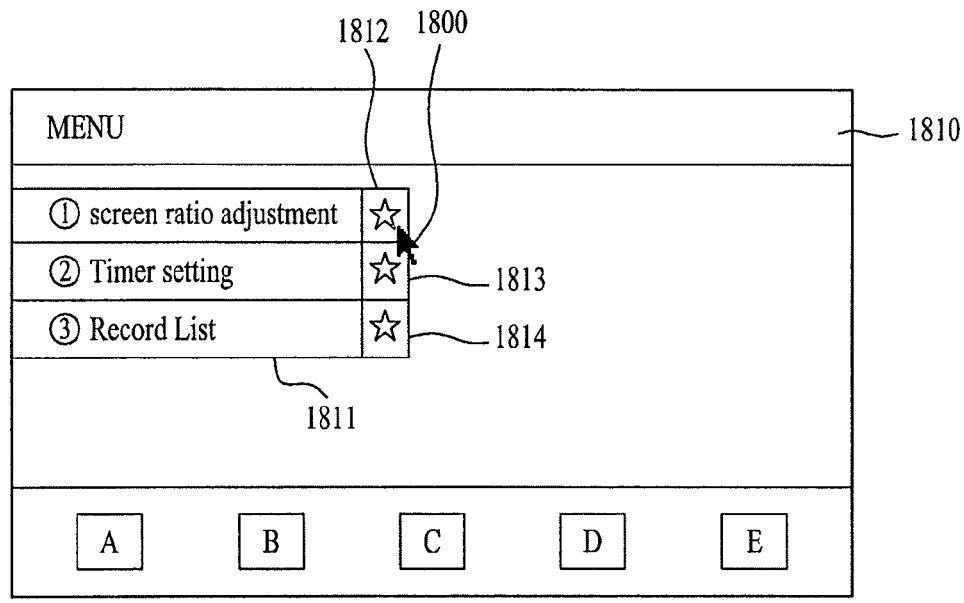
FIGS. 18A to 18C are views illustrating a procedure for mapping a general menu function to an application and carrying out the mapped result.
Figure 18B:
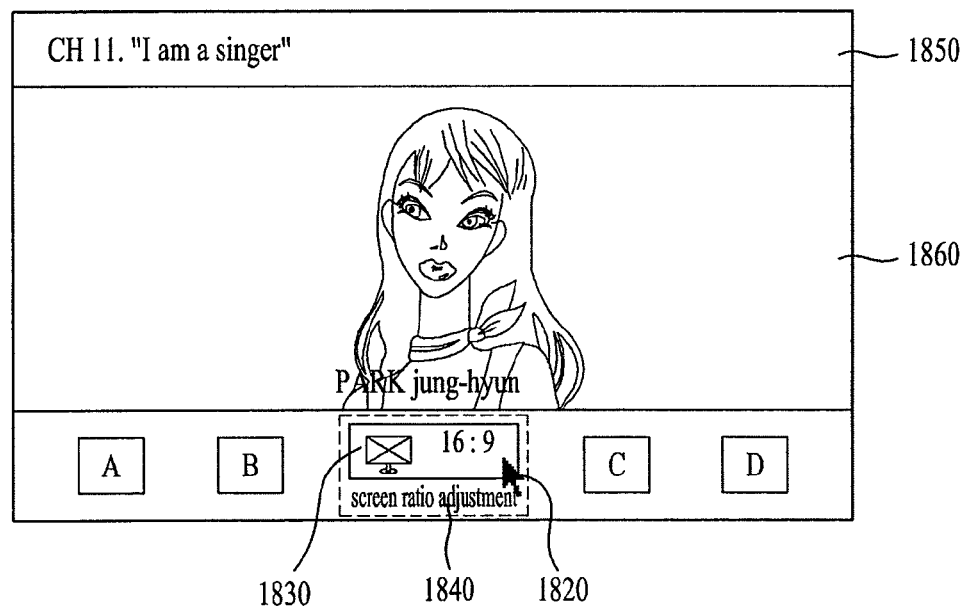
Figure 18C:
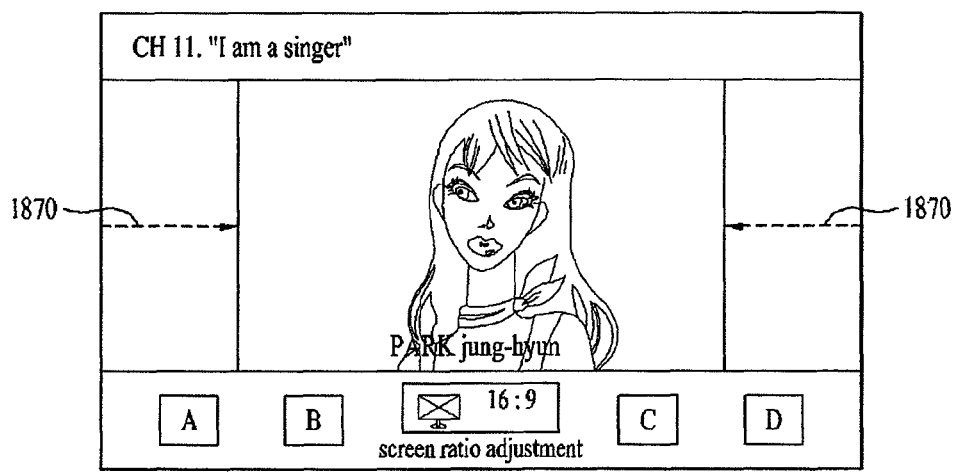

FIGS. 18A to 18C are views illustrating a procedure for mapping a general menu function to an application and carrying out the mapped result.

In accordance with the invention, while the user views an arbitrary channel broadcast program, the computing device of the invention may apply the capture function not only to the video phone service but also to a general TV function.

For example, as shown in FIG. 18A, the computing device according to one embodiment of the invention activates a menu 1810 and displays a list 1811 associated with the menu 1810. In addition, capture buttons (1812, 1813, 1814) for individual functions displayed in the list 1811 may also be displayed. Therefore, the user can perform the capture function using the indicator 1800. For convenience of description, it is assumed that the user clicks on the "screen ratio adjustment" function as shown in FIG. 18A.

In this instance, text 1840 for directing screen ratio adjustment and a representative image 1830 are newly added to the application list located at a lower part of FIG. 18B. Of course, although the captured image can be used as previously stated above, it should be noted that the legacy image data stored in the memory may be selected according to the general TV function as needed.

Further, as shown in FIG. 18B, if the user desires to adjust the screen ratio when the broadcast program 1860 of channel #11 (1850) is displayed, the user must locate the indicator 1820 at the image 1830 of the newly generated application so as to adjust the screen ratio.

As a result, the screen ratio of the broadcast program is automatically changed as shown in '1870' of FIG. 18C. According to the related art, the user must click on the menu item for screen ratio adjustment, and must directly check the detailed list associated with the selected menu. Although the user must perform several tens of depths as necessary in the related art, the embodiment of the invention can implement a user-desired function using only one click.

Figure 19A:
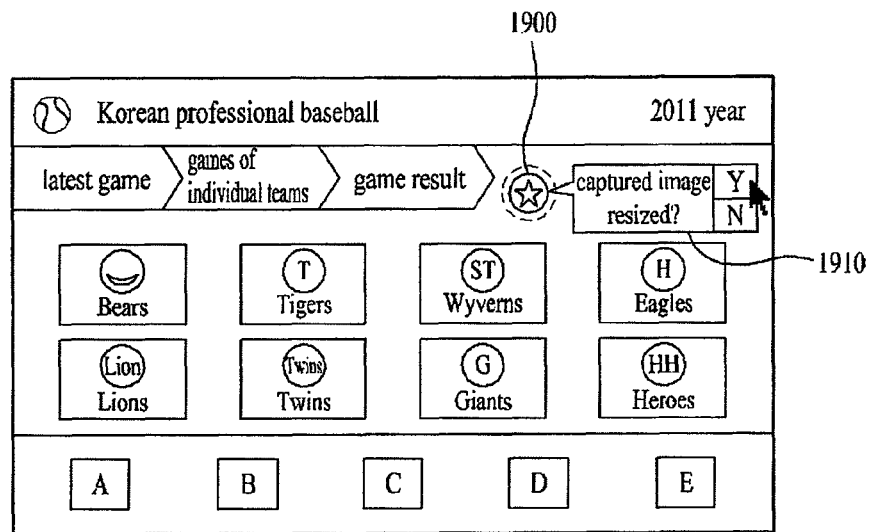
FIGS. 19A to 19C are views illustrating a process for changing a representative image of an application by cropping a captured image according to one embodiment of the invention.
Figure 19B:
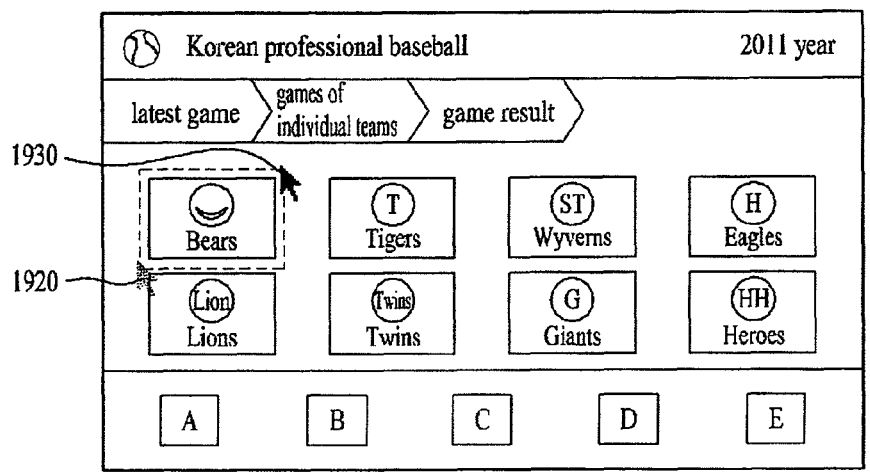
Figure 19C:
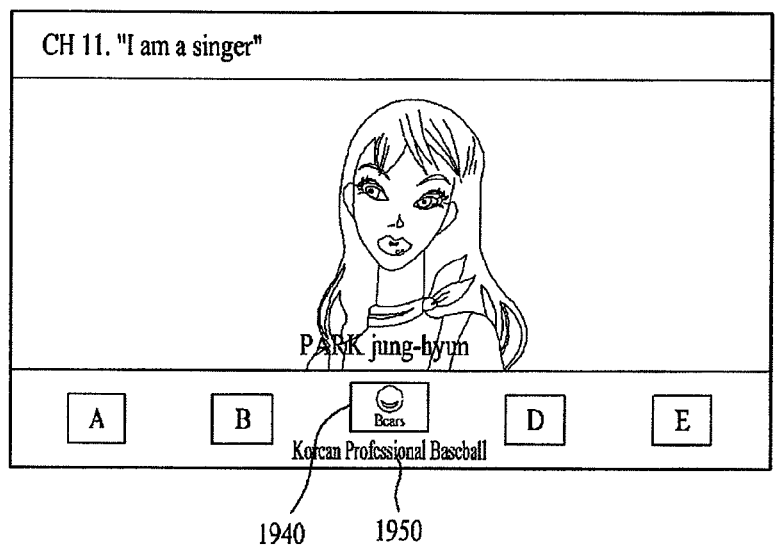

FIGS. 19A to 19C are views illustrating a process for changing a representative image of an application by cropping a captured image according to one embodiment of the invention.

As can be seen from the detailed description of the drawings prior to FIGS. 19A-19C, a current broadcast image was captured and used without change, and the image stored in the memory was retrieved and used. However, FIGS. 19A-19C show tools for editing a user-desired captured image, and a detailed description thereof will hereinafter be described with reference to FIGS. 19A-19C.

For convenience of description, it is assumed that a program of Korean professional baseball is executed as shown in FIG. 19A. If the user clicks on the capture button 1900, an option 1910 for querying whether or not the captured image will be resized and displayed differently Referring to FIG. 19B, if the user clicks on two locations 1920 and 1930 to be cropped, only the corresponding rectangle is automatically cropped so that the cropped result can be used as an image for the application. In more detail, as can be seen from FIG. 19C, not only text 1950 for directing or indicating the program regarding Korean professional baseball but also an image 1940 of the user-cropped part is contained in the application list.

The two reasons for the above-mentioned design are as follows. The first reason is that the entire captured image may not satisfy user intention, or the amount of immediate visualization information capable of being used for the shortcut function is insufficient. The second reason is that the captured image for a specific part may be formed according to user intention. For example, from among many Korean professional baseball teams, the captured image of a representative logo indicating a professional baseball team supported by the user may be considered to be representative of the corresponding professional baseball team.

Figure 20:
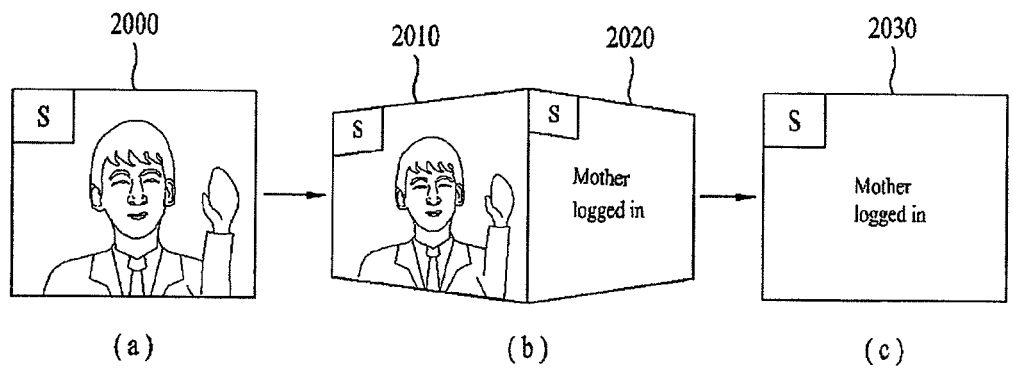
FIG. 20 illustrates a procedure for rotating an application to the left or right under the condition that the application has been updated according to one embodiment of the invention.

FIG. 20 illustrates a procedure for rotating an application to the left or right under the condition that the application was updated according to one embodiment of the invention.

As previously stated above, it is assumed that the application represented as the captured image 2000 is automatically generated. In this instance, as shown in (c) of FIG. 20, it is assumed that a face image of the counterpart (for example, a mother) is captured during execution of the video communication service. On the other hand, in the instance in which identification information of the mother ("Mom") mapped to the generated application has logged out and then logs in to the application in a subsequent process, a user interface (UI) for quickly informing the user of the above-mentioned instance is needed.

Therefore, as shown in (b) of FIG. 20, as the initial original image 2010 gradually moves to the left, the original image 2010 gradually disappears, and a new image 2020 indicating that the mapped mother identification information was recognized again is gradually displayed. Subsequently, as shown in (c) FIG. 20, the initial original image completely disappears and only the image 2030 indicating update information is displayed. In addition, as shown in FIG. 20, a user interface (UI) for gradually or progressively switching from a first image to a second image is selected, instead of using a scheme for suddenly replacing a current image with another image, such that the user can more easily and quickly recognize update information of the corresponding application.

FIG. 20 illustrates a procedure for rotating an application upward and downward under the condition that the application was updated according to one embodiment of the invention.

Figure 21:
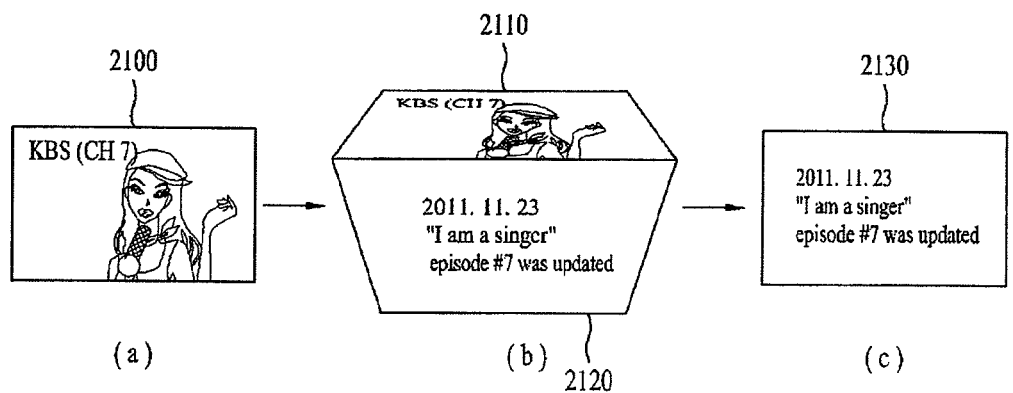
FIG. 21 illustrates a procedure for rotating an application upward and downward under the condition that the application was updated according to one embodiment of the invention.

Compared to FIG. 20, the embodiment of FIG. 21 is different from the embodiment of FIG. 20 in two aspects. The embodiment of FIG. 21 is characterized in that the application is mapped to a web address or the like provided from the content provider (CP), and the update information is adjusted not in the horizontal direction but in the vertical direction.

First, a user who selects an arbitrary channel activates the capture function according to one embodiment of the invention, and a function for accessing the CP providing the captured content is mapped to a new application. Therefore, as shown in (a) of FIG. 21, a captured image 2100 is displayed as a representative image of the new application.

Further, if information associated with the captured content is updated, the initial original image 2110 gradually or progressively disappears while simultaneously moving or rotating upward, and an image 2120 for displaying update information is gradually or progressively displayed.

In the end, as shown in (c) of FIG. 21, only the image 2120 for displaying the update information is displayed. In FIG. 21, the image of (c) of FIG. 21 may also return to the image of (a) of FIG. 21 according to the lapse of time or user selection without departing from the scope or spirit of the invention.

Furthermore, the reason why the rotation direction of FIG. 20 is designed in a different way from FIG. 21 is as follows. In the instance of the application shown in FIG. 21, a horizontal length of the captured image is relatively longer than a vertical length thereof, such that the user can more easily and conveniently recognize the vertically rotating image than the horizontally rotating image. As a result, it is preferable, but not required, that the rotation direction of FIG. 20 and the rotation direction of FIG. 21 be designed in different ways.

Figure 22:
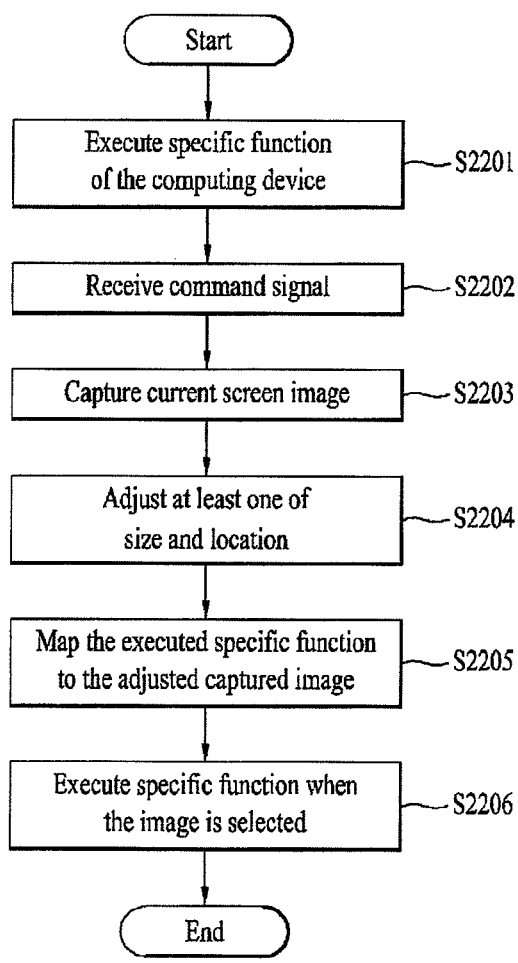
FIG. 22 is a flowchart illustrating a procedure for generating an application using a captured image according to one embodiment of the invention.

FIG. 22 is a flowchart illustrating a procedure for generating an application using a captured image according to one embodiment of the invention. In FIG. 22, if necessary or desired, some operations may be omitted and other operations may be added without departing from the scope or spirit of the invention. Further, the embodiment of FIG. 22 may also be additionally interpreted with reference to FIGS. 1 to 21.

In accordance with a method for controlling the computing device that performs at least one function, a specific function from among at least one function is carried out in operation S2201. In addition, the computing device receives a command signal during execution of the specific function in operation S2202. For example, the command signal may be activated when a capture button is pressed.

In response to execution of the specific function and the command signal, an output screen image is captured in operation S2203. At least one of a size and a location of the captured image is adjusted in operation S2204. In this instance, the executed specific function is mapped to the adjusted captured image, and the mapped result is stored in a memory in operation S2205.

If the image having the adjusted size and/or location was selected, a function corresponding to any one of at least one metadata mapped to the image is carried out. For example, if there is only one function capable of being mapped to the image, the function can be automatically mapped to the image. If there are multiple functions capable of being mapped to the image, a menu for enabling a user to select a desired function may be provided to the user as shown in FIG. 12. Alternatively, one default function may also be automatically selected without departing from the scope or spirit of the invention.

On the other hand, the method for controlling the computing device in accordance with another embodiment of the invention may further include determining a type of the specific function, and calculating the size and/or location of the captured image in different ways according to the determined result. Since the associated description has already been disclosed in FIGS. 7 and 8, the same explanation will not be repeated herein for clarity.

In accordance with another embodiment of the invention, the method for controlling the computing device may further include generating an application in which an image having the adjusted size and location is mapped to the specific function, and storing the generated application in the memory.

Figure 23:
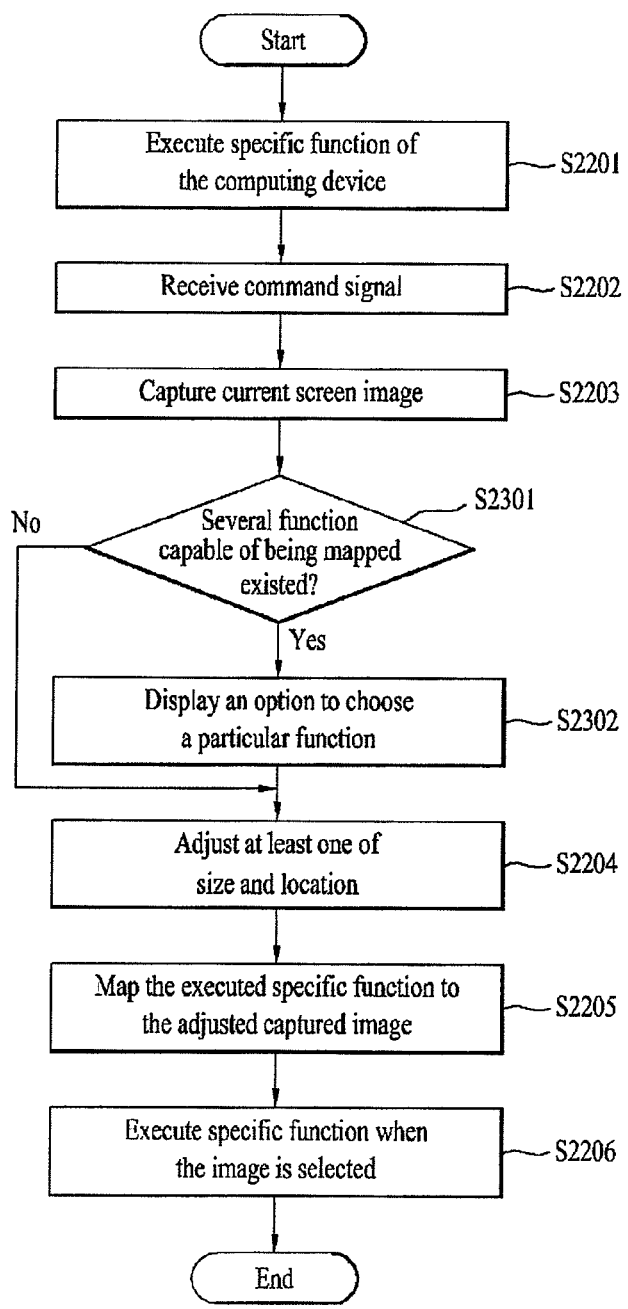
FIG. 23 is a flowchart illustrating a procedure for generating an application using a captured image according to another embodiment which supplements the embodiment of FIG. 22.

FIG. 23 a flowchart illustrating a procedure for generating an application using a captured image according to another embodiment, which supplements the embodiment of FIG. 22. If necessary, the other scope or spirit of the invention may also be implemented by combining the embodiment of FIG. 23 and the embodiment of FIG. 22.

FIG. 23 show two additional operations added between the operation S2203 and the operation S2204 of FIG. 22.

That is, when receiving a first content from the first channel and outputting the first content in response to the above-mentioned specific function, the computing device may determine the presence or absence of multiple functions capable of being mapped in operation S2301. In this instance, at least one option capable of selecting a specific function is displayed in operation S2302. Since the associated description has already been disclosed in FIG. 12, those skilled in the art can readily implement the embodiment of FIG. 23 by referring to the corresponding drawings.

For example, if a first option (i.e., item ① of the menu 1220 of FIG. 12) from among at least one displayed option is selected, the operation for performing the function corresponding to any one of at least one metadata performs channel switching to the first channel.

On the other hand, if a second option (i.e., item ② of the menu 1220 of FIG. 12) from among at least one displayed option is selected, the operation for performing the function corresponding to any one of at least one metadata is controlled by the CP that provides an additional service related to the first content.

Finally, if a third option (i.e., item ③ of the menu 1220 of FIG. 12) from among at least one displayed option is selected, the operation for performing a function corresponding to any one of at least one metadata is controlled to display some parts of the first content stored in the memory from the capture start time.

Figure 24:
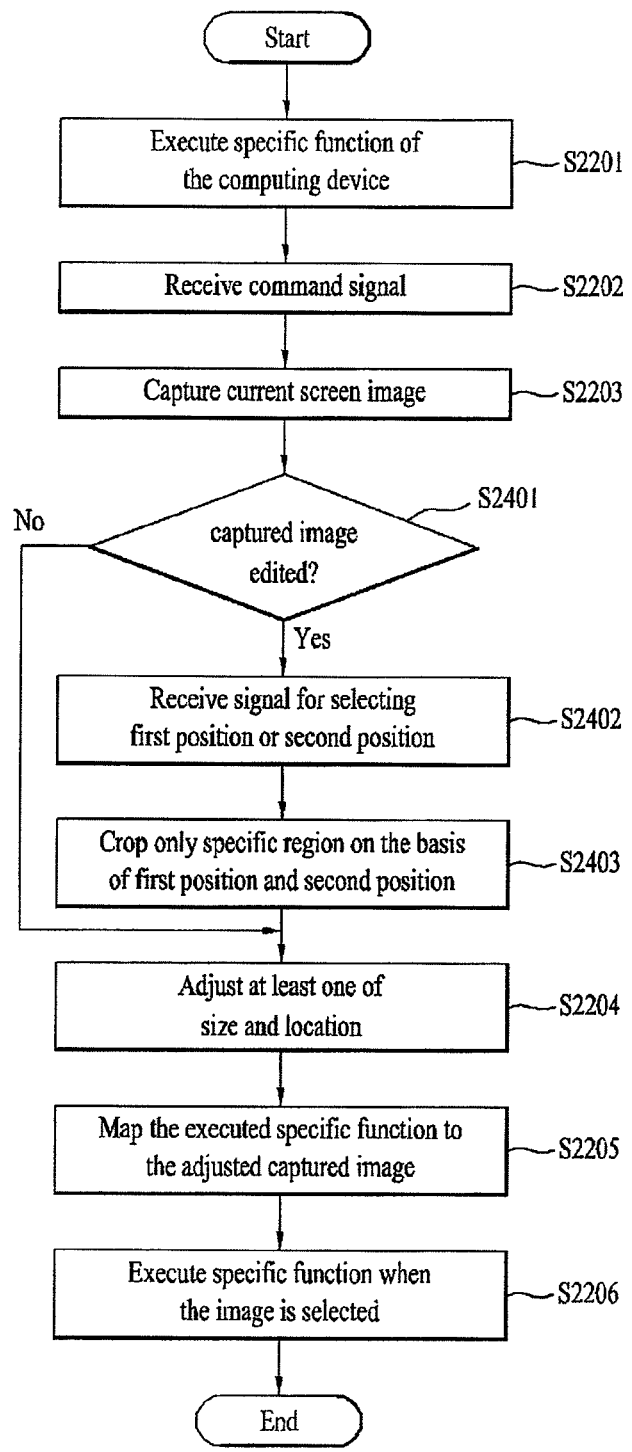
FIG. 24 is a flowchart illustrating a procedure for generating an application using a captured image according to another embodiment which supplements the embodiment of FIG. 22.

FIG. 24 is a flowchart illustrating a procedure for generating an application using a captured image according to another embodiment which supplements the embodiment of FIG. 22. If necessary, the other scope or spirit of the invention may also be implemented by combining the embodiment of FIG. 24 and the embodiment of FIG. 22.

In FIG. 24, the operations added between operations S2203 and S2204 of FIG. 22. In addition, one embodiment may be implemented by combining the embodiment of FIG. 23 and the embodiment of FIG. 24, or two embodiments may also be implemented using only individual flowcharts of FIGS. 23 and 24.

As shown in FIG. 24, OSD for querying whether or not the size of the captured image will be edited is displayed in operation S2401. In addition, the computing device receives a signal for selecting two points of a region to be captured by the user in operation S2402. The computing device according to one embodiment of the invention crops only a specific region on the basis of two points (two locations) selected by the user, such that the cropped result is used as a representative image of the application in operation S2403. A more detailed description thereof will be readily appreciated by those skilled in the art by referring to FIG. 19.

Figure 25:
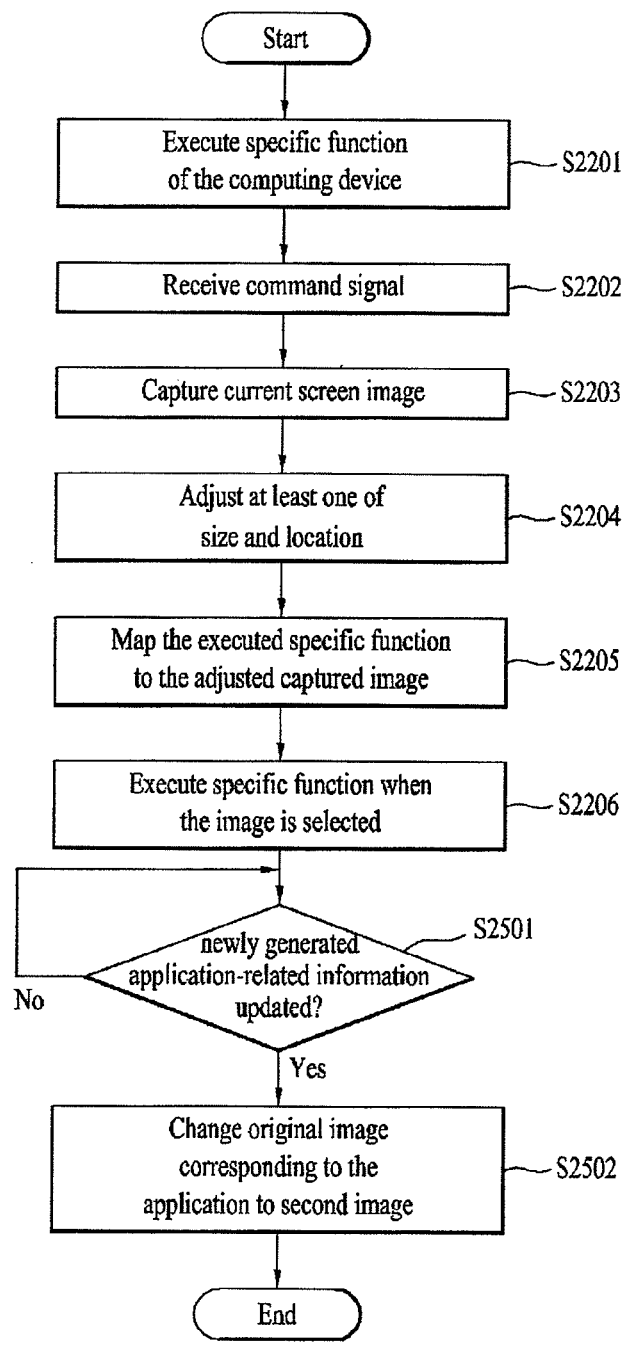
FIG. 25 is a flowchart illustrating a procedure for generating an application using a capture image according to still another embodiment which supplements the embodiment of FIG. 22.

FIG. 25 is a flowchart illustrating a procedure for generating an application using a captured image according to another embodiment which supplements the concepts of FIG. 22. If necessary, the other scope or spirit of the invention may also be implemented by combining the embodiment of FIG. 25 and the embodiment of FIG. 22.

FIG. 25 show two additional operations added after the operation S2206 of FIG. 22.

Referring to FIG. 25, it is determined whether additional information related to the application stored in the memory was updated in operation S2501. If the additional information was updated in operation S2501, the first image having the adjusted size and location is readjusted to a second image in operation S2502. For example, the operation S2502 is designed in a manner that the first image is replaced with the second image, and the second image relates to the updated additional information. A detailed description thereof has already been disclosed in FIGS. 20 and 21, such that associated embodiments can be repeatedly implemented by those skilled in the art.

FIGS. 26 to 30 are views illustrating a procedure for establishing a location of an application corresponding to a captured image according to one embodiment of the invention. As described above, the application generated as the captured image according to one embodiment of the invention automatically moves to the application list (hereinafter also referred to as "launch bar").

The solution for providing a more dynamic user interface while a current indicator moves to a user-desired position will hereinafter be described with reference to FIGS. 26 to 30.

Figure 26:
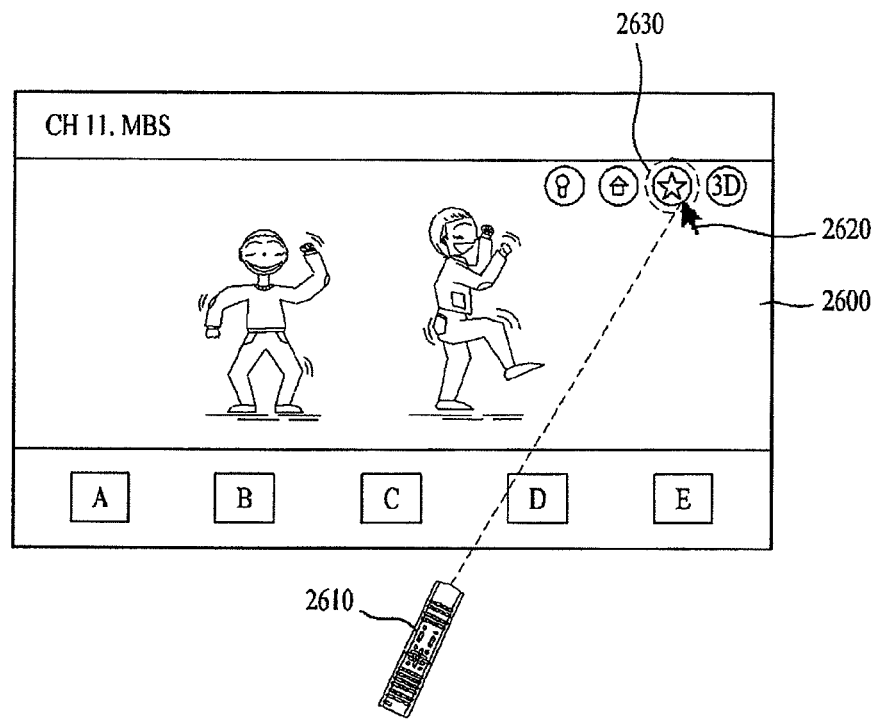
FIGS. 26 to 30 are views illustrating a procedure for establishing a location of an application corresponding to a captured image according to one embodiment of the invention.

Referring to FIG. 26, when the user who views an arbitrary channel confirms a desired scene 2600 and at the same time desires to construct the confirmed scene as a new application, the pointer 2620 of the motion remote controller 2610 is located at the capture option 2630. Since the motion remote controller 2610 has already been disclosed in FIGS. 5 and 6, the same explanation will not be repeated herein for clarity.

Figure 27:
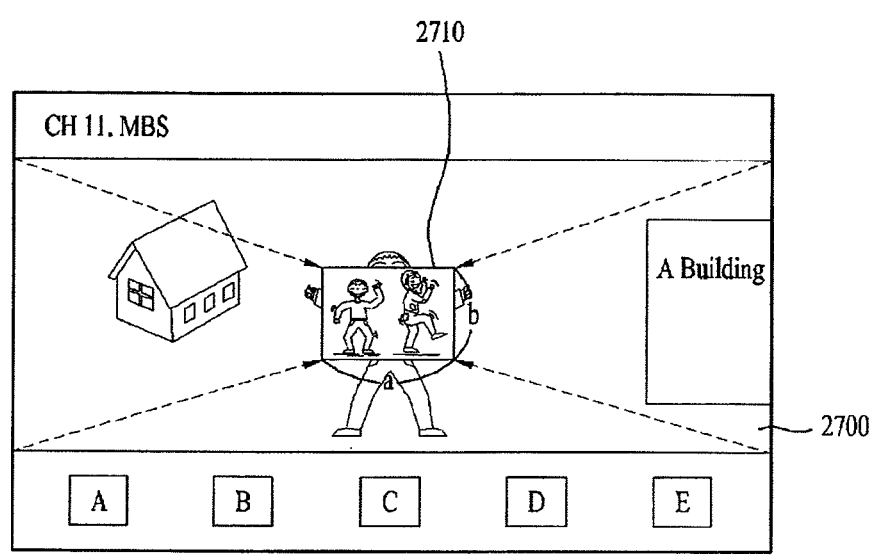

Referring to FIG. 27, the captured image 2710 is automatically changed to be smaller in size than the original image 2600 so that the resultant image has a horizontal length (a) and a vertical length (b), and is designed to be located at the center part of the screen 2700. Since the screen 2700 continuously displays a broadcast program of a current channel, although the capture function of the embodiment is activated, the user can freely view the broadcast program of the current channel without disturbance. Further, the captured image is automatically resized and then moves to the center part, such that the user can easily recognize the fact that the captured image must be quickly inserted into the list.

Figure 28:
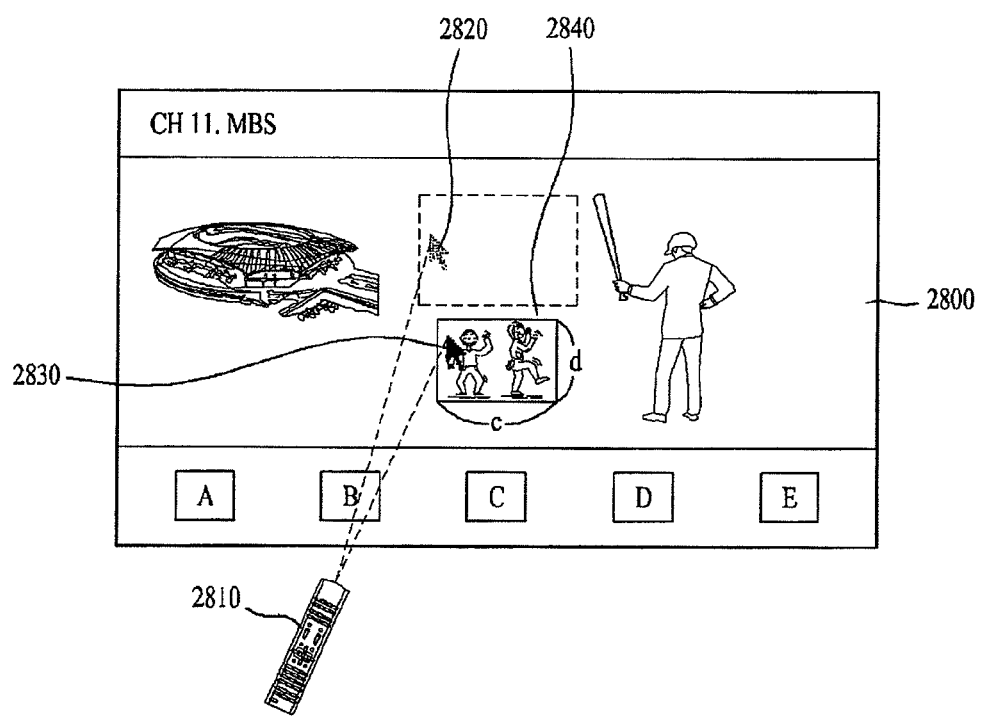

In this instance, as shown in FIG. 28, the user moves the pointer corresponding to motion of the remote controller 2810 from the first position 2820 to the second position 2830. Therefore, the captured image 2840 of FIG. 28 becomes smaller than that of FIG. 27. For reference, the captured image shown in FIG. 28 has the length values (c, d) whereas the captured image shown in FIG. 27 has the length values (a, b). Here, the length values (c, d) are relatively smaller than the length values (a, b).

In addition, if the pointer moves to the list region (i.e. if the pointer moves downward), this means that the pointer moves in the appropriate direction, such that the pointer may easily inform the user that the corresponding direction or application can be contained in the list. In this instance, the broadcast screen 2800 is not fixed, and a current channel broadcast program is continuously displayed in real time.

Figure 29:
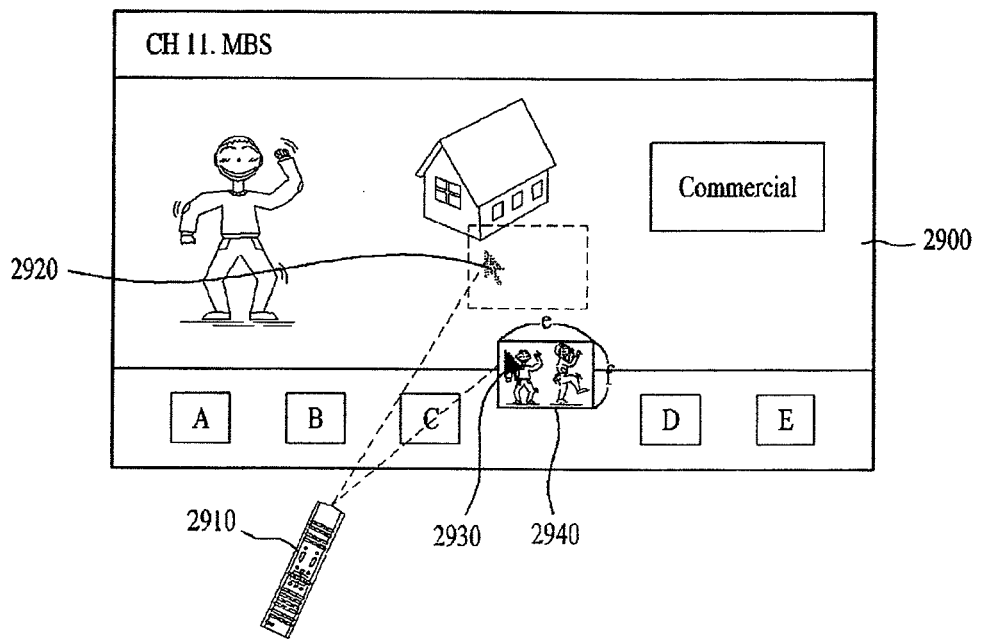

Subsequently, as shown in FIG. 29, the user moves the pointer corresponding to motion of the remote controller 2910 from the first position 2920 to the second position 2930. Therefore, the captured image 2940 is resized to have a horizontal length (e) and a vertical length (f) so that the conventional application image can be contained in the list. However, the conventional application image is not completely contained in the list, such that it is established to be slightly larger than the image size of the conventional applications, thereby directing the user to move the pointer downward. As described above, the current channel broadcast 2900 is continuously displayed in real time.

Figure 30:
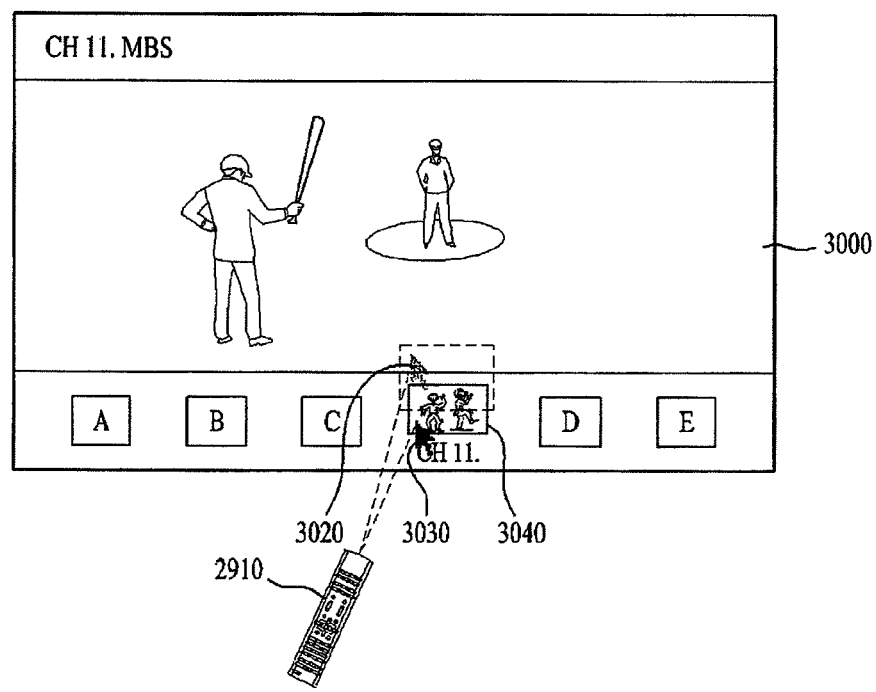

Finally, as shown in FIG. 30, the user moves the pointer corresponding to a motion of the remote controller 3010 from the first position 3020 to the second position 3030. Therefore, the size of the final captured image 3040 may be identical to that of a representative image of the conventional application, or may be slightly different from that of the representative image by a predetermined value (e.g., 5% or 3%). As described above, the current channel broadcast 3000 is continuously displayed in real time.

That is, as shown in FIGS. 26 to 30, the user may move the captured image in an arbitrary direction by dragging the captured image. Specifically, as the user drags the captured image in an appropriate direction (toward a region including the application list), the captured image is gradually reduced in size. Therefore, the invention has an advantage in that the user can recognize which direction is to be used as the movement direction of the captured image without using a special indicator.

Although the embodiments shown in FIGS. 1 to 30 have been disclosed independent of each other for convenience of description, it should be noted that other embodiments may be implemented by combining some parts of characteristics of FIGS. 1 to 30 without departing from the scope or spirit of the invention.

FIGS. 31 to 40 illustrate example UIs for accessing personalization pages according to the invention. The concepts of FIGS. 31 to 40 can be realized by accessing a family item or pointing at a predetermined region. In the meantime, UIs shown in FIGS. 31 to 40 may be configured in two or three dimensions (2D or 3D).

In other words, if a family mode is requested by the user, the computing device provides a UI for accessing the family mode using any one of FIGS. 31 to 40. In this instance, the user interface (UI) may be provided independently or collectively after the screen or menu being provided to the screen disappears. In this instance, the screen or menu may be located at the back side or may be blurred, as compared to the above-mentioned UI.

Figure 31:
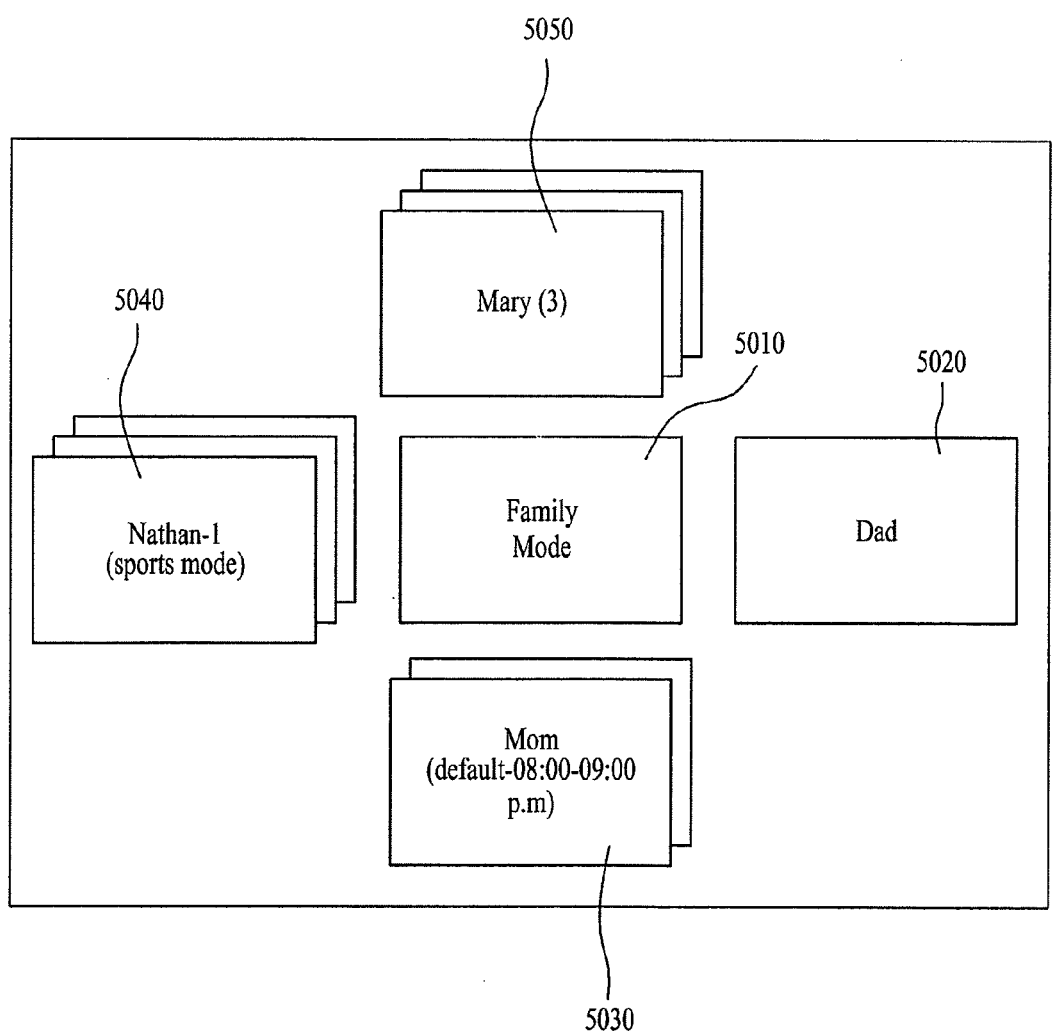
FIGS. 31 to 40 illustrate example UIs for accessing personalization pages according to the invention.

In FIG. 31, if the family mode is requested by the user, the computing device provides icons (5020 to 5050) of individual users (belonging to family) who have configured personalization pages at positions corresponding to at least four cardinal directions (north, south, east, and west) on the basis of an icon (denoted by "family mode") 5010 that is displaying a current screen. In this instance, icons (5020, 5030, 5040 and 5050) indicating four directions may be pre-configured and fixed, or directions of the icons 5020 to 5050 may also be changed to other directions. In addition, after any one of the icons 5020 to 5050 has been pointed, a current screen image may be changed to a personalization page configuration screen through which the user can add the personalization page. Alternatively, a variety of information, such as size, color, shape, text, and the like, may be modified as necessary. Needless to say, the above-mentioned information may be modified or controlled only when due rights exist. In other words, the above-mentioned information may be modified or controlled by a user having access to the information.

As can be seen from FIG. 31, personalization pages of 'Dad' are located a the east of the center icon (family mode), personalization pages of "Nathan-1" are located at the west thereof, personalization pages of "Mary" are located at the north thereof, and personalization pages of "Mom" are located at the south thereof. Of course, according to another embodiment of the invention, personalization pages of individual members of the family are not immediately displayed, and specific personalization pages are displayed only when a specific tab is selected, resulting in an increase in spatial efficiency.

In this instance, the computing device may further provide additional information for personalization pages of each user. For example, a family member "Mary" located at the north is configured in the form of "Mary(3)" as shown in FIG. 31. It can be recognized that three personalization pages for Mary are configured. In this instance, the computing device may assign numerals or alphabets to personalization pages, or the personalization pages may also be represented by as many layers as the number of personalization pages. In addition, personalization pages of "Nathan" located at the west are displayed as shown in "Nathan-1", and the presence of multiple personalization pages may be displayed. If necessary, attributes or characteristics ("sports mode") of the corresponding page may also be written below "Nathan-1" as shown in FIG. 31. Meanwhile, the icon of personalization pages of "Mom" located at the south may indicate the basic page (i.e., the default page) in the family mode, or the Mom's personalization pages may be changed to the default page at specific times (PM 8:00 to PM 9:00).

Figure 32:
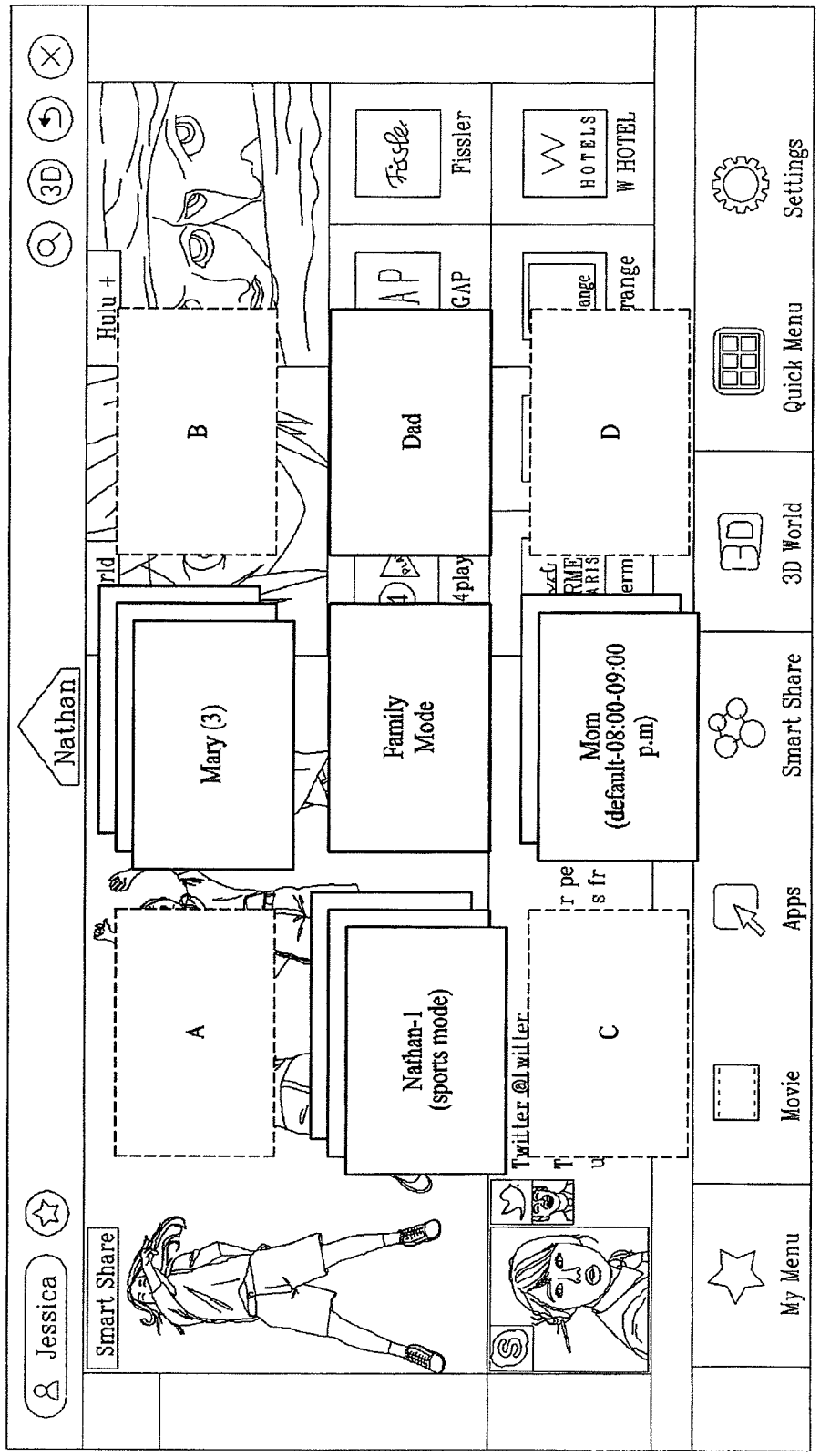

If the direction is added to the concept of FIG. 31, the concept of FIG. 32 can be realized. The concept of FIG. 32 may be used when there are many more users linked to the family than the concept of FIG. 31. In addition, the concept of FIG. 32 can allow personalization pages additionally added by the user to be simultaneously identified without using the hierarchical structure. On the other hand, the scope or spirit of the invention is not limited thereto, can be continuously extended from a current direction to two dimensions (2D) so as to provide an icon. In this instance, if it is difficult to display all items on a single screen, the user drags the corresponding item using the pointer such that the item may be displayed while simultaneously moving to a predetermined direction by revealing a different page. The computing device may further identify the presence of additional icon(s) in a predetermined direction by use of arrows or other indicia.

Meanwhile, the personalization pages may be classified and modified according to various criteria (such as themes, genres, and time zones) instead of users.

Figure 33:
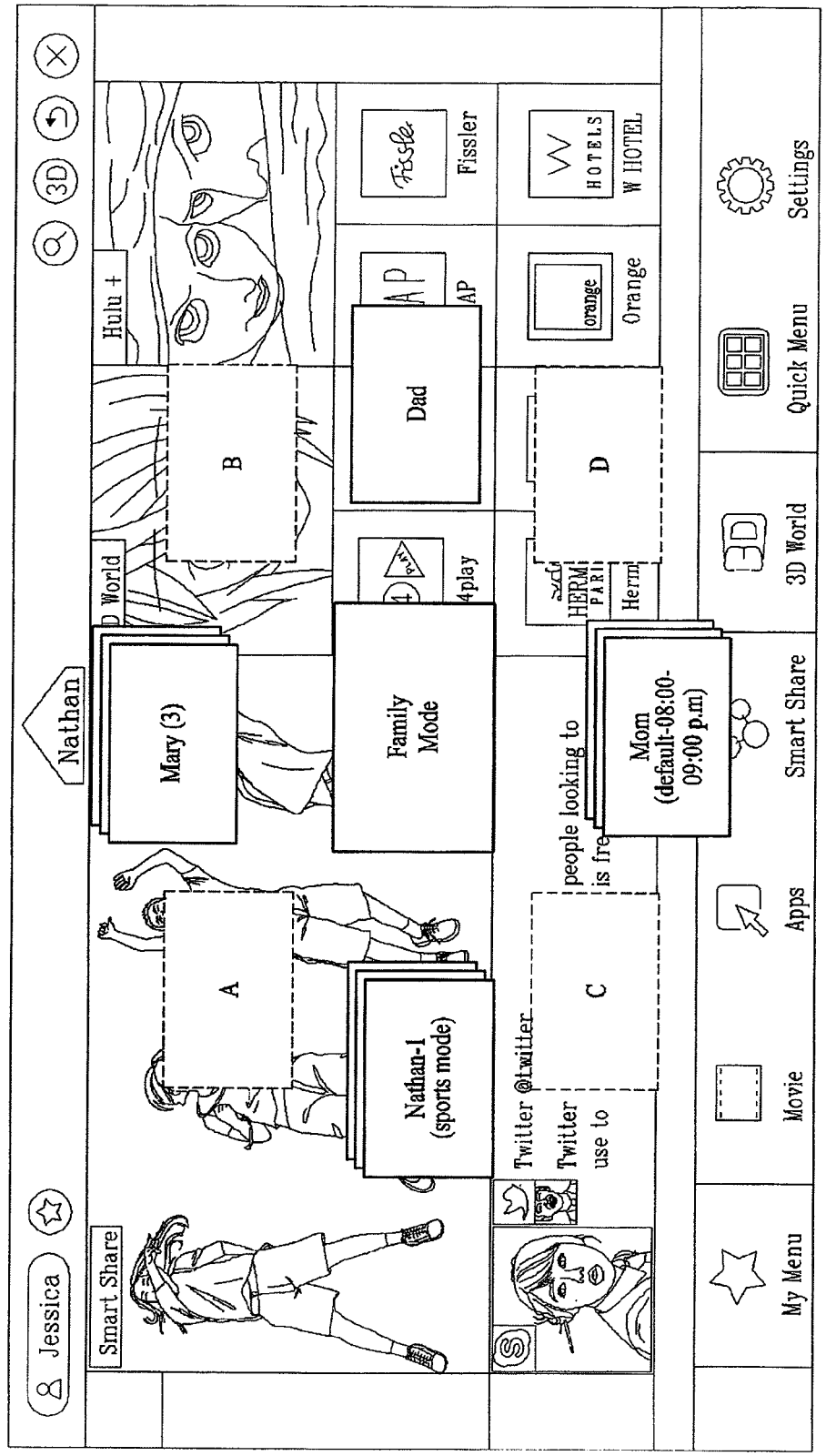

Although the concept of FIG. 33 is similar to that of FIG. 32, FIG. 33 shows personalization pages arranged in the form of a circle, and not a square. In this instance, personalization pages of FIG. 33 are configured in a 3D format so that the personalization pages of FIG. 33 can also be configured in the form of a ring or ball in a 3D mode.

Figure 34:
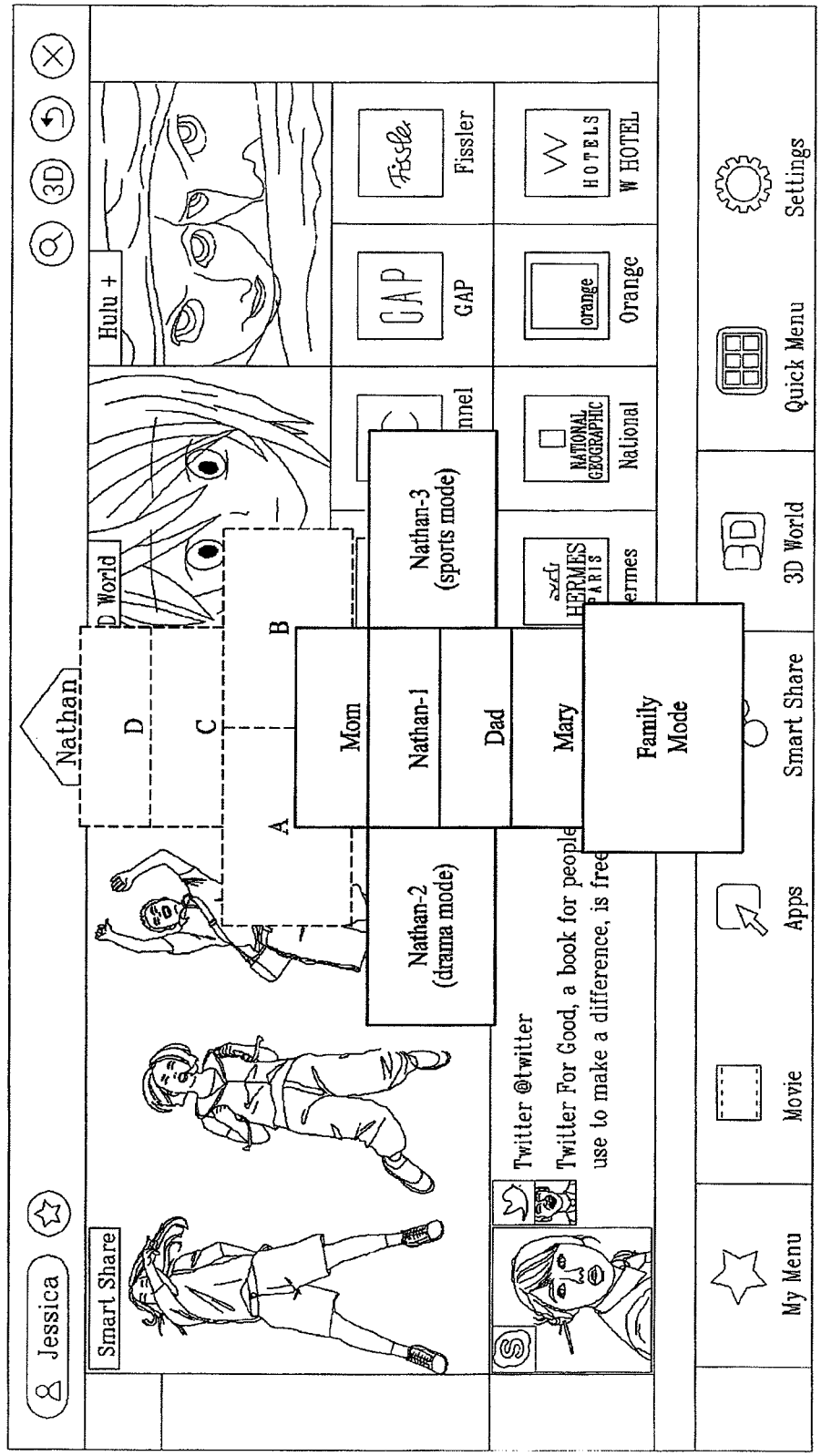

Referring to FIG. 34, user interfaces (UIs) are configured in the form of a hierarchical structure on the basis of the family mode, such that UIs may be provided in the form of operations arranged in the order of Mary→Dad→Nathan-1→Mom. In this instance, several personalization icons indicating the personalization pages may be arranged vertically or horizontally. For example, the personalization icons may also be displayed in a planar or hierarchical manner.

On the other hand, if Mary is selected in FIG. 34, the icon indicating the family mode may disappear and move to the rearmost position, such that the icon "Mary" is located at the foremost position. In this instance, if the icon "Mary" is pointed, three personalization pages belonging to Mary are spread out vertically or horizontally. Thereafter, if the icon "Mom" is selected, the icon "Mom" is located at the uppermost position, and the remaining icons other than "Mom" are sequentially located below the icon "Mom".

The UI of FIG. 34 may be tilted in a manner that the upper pages and the lower pages can be simultaneously identified. As a result, the user can sequentially access a plurality of icons, and can immediately access a desired icon located at the lower part through only one click.

Figure 35:
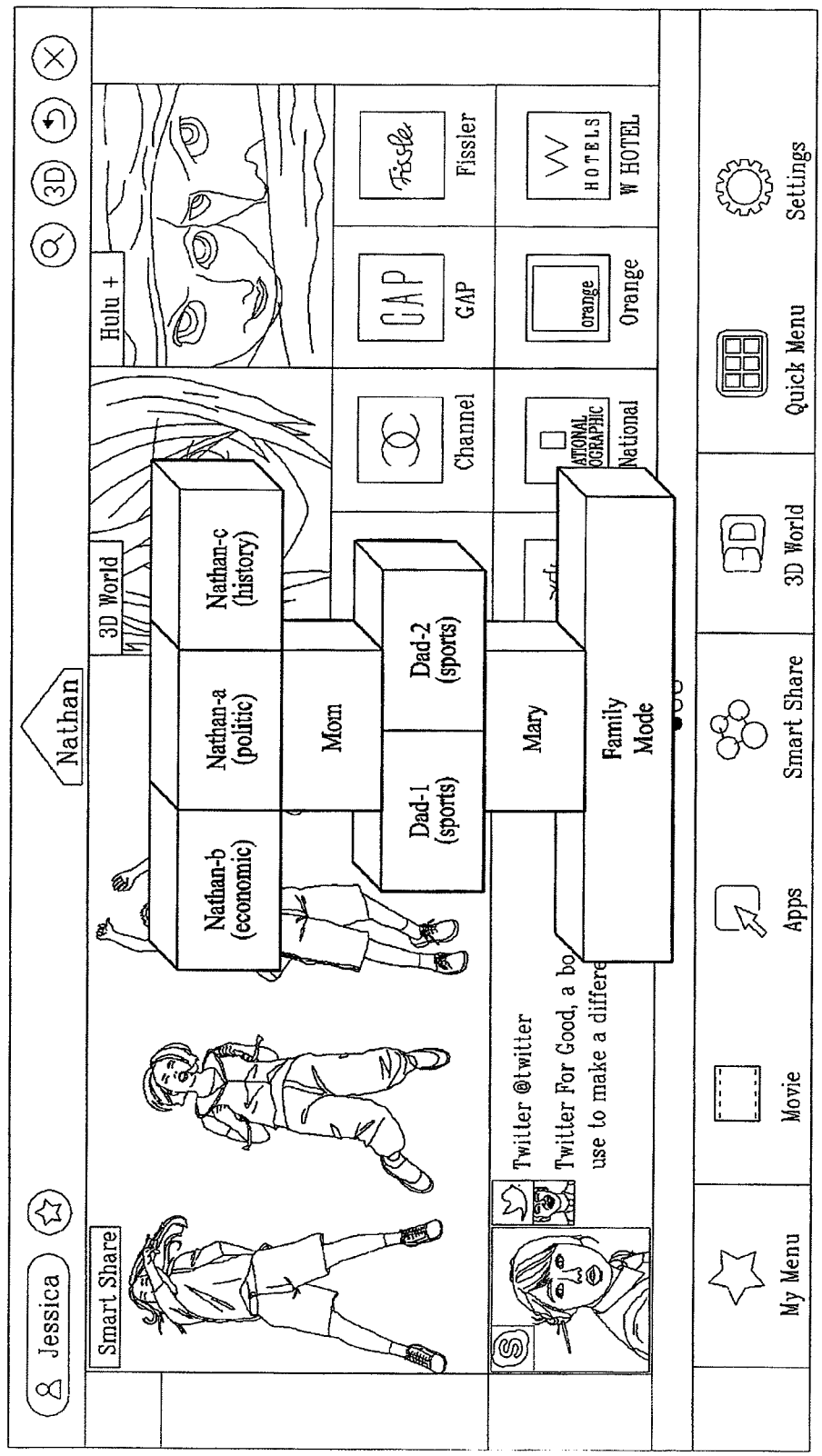

FIG. 35 shows the family mode configured in a vertical structure. In this instance, the upper or lower concept may not exist. Each icon configured in the form of a block is displayed, and may be configured in various formats, such as a triangle or an inverted triangle. In this instance, in the instance of the icon "Dad", attributes or characteristics of individual pages are further written as shown in "Dad-1" (sports)", "Dad-2(news)", "Nathan-a(politics)", "Nathan-b (economics)", "Nathan-c(history)", etc., so that the user can easily access a desired page by referring to the written attributes or characteristics.

Figure 36:
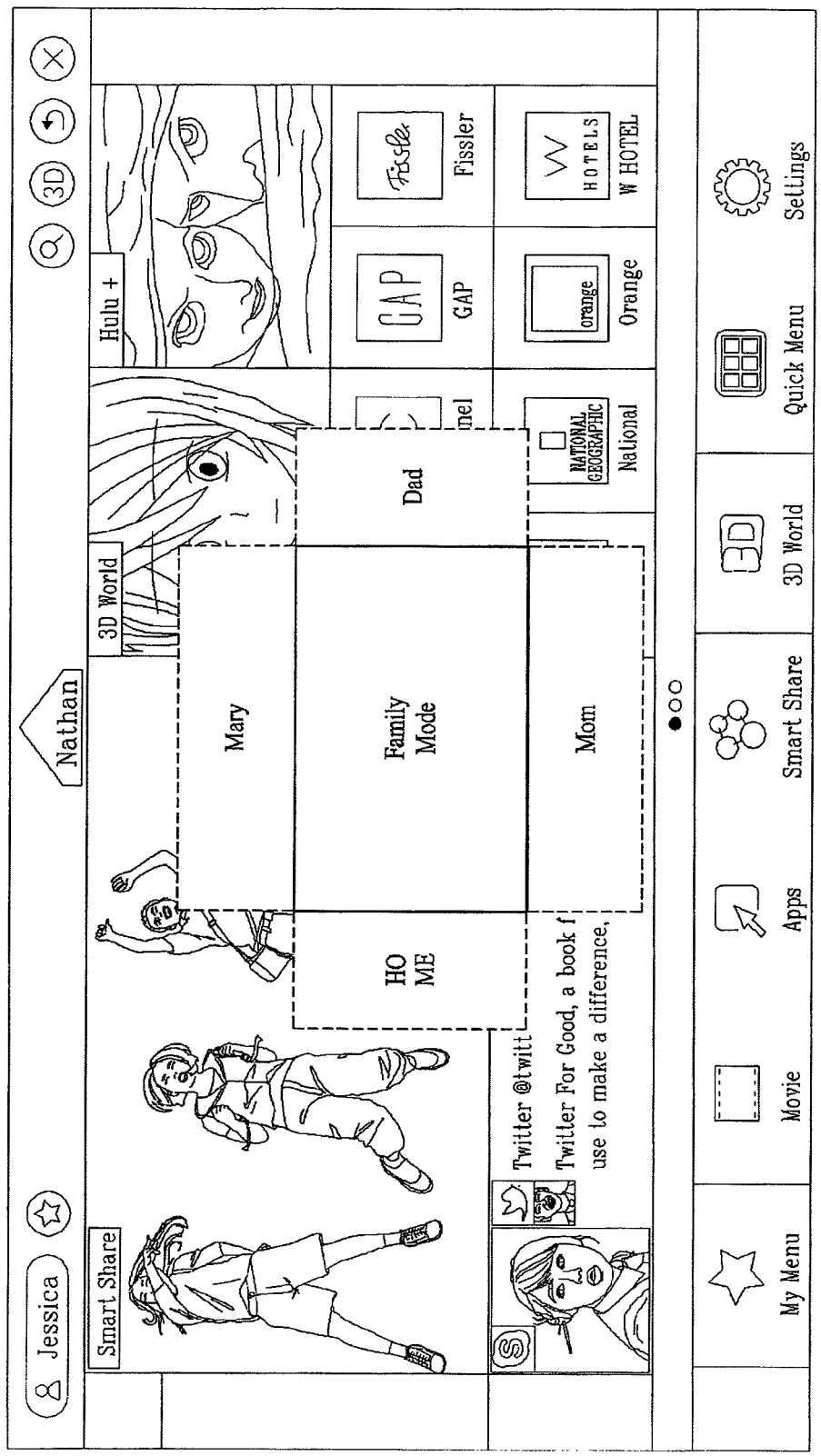

FIG. 36 shows a family mode UI configured in a planar format. Referring to FIG. 36, icons for accessing pages are displayed in individual directions. If a specific icon is selected, sub-icons or the like associated with the selected icon may be provided.

Figure 37:
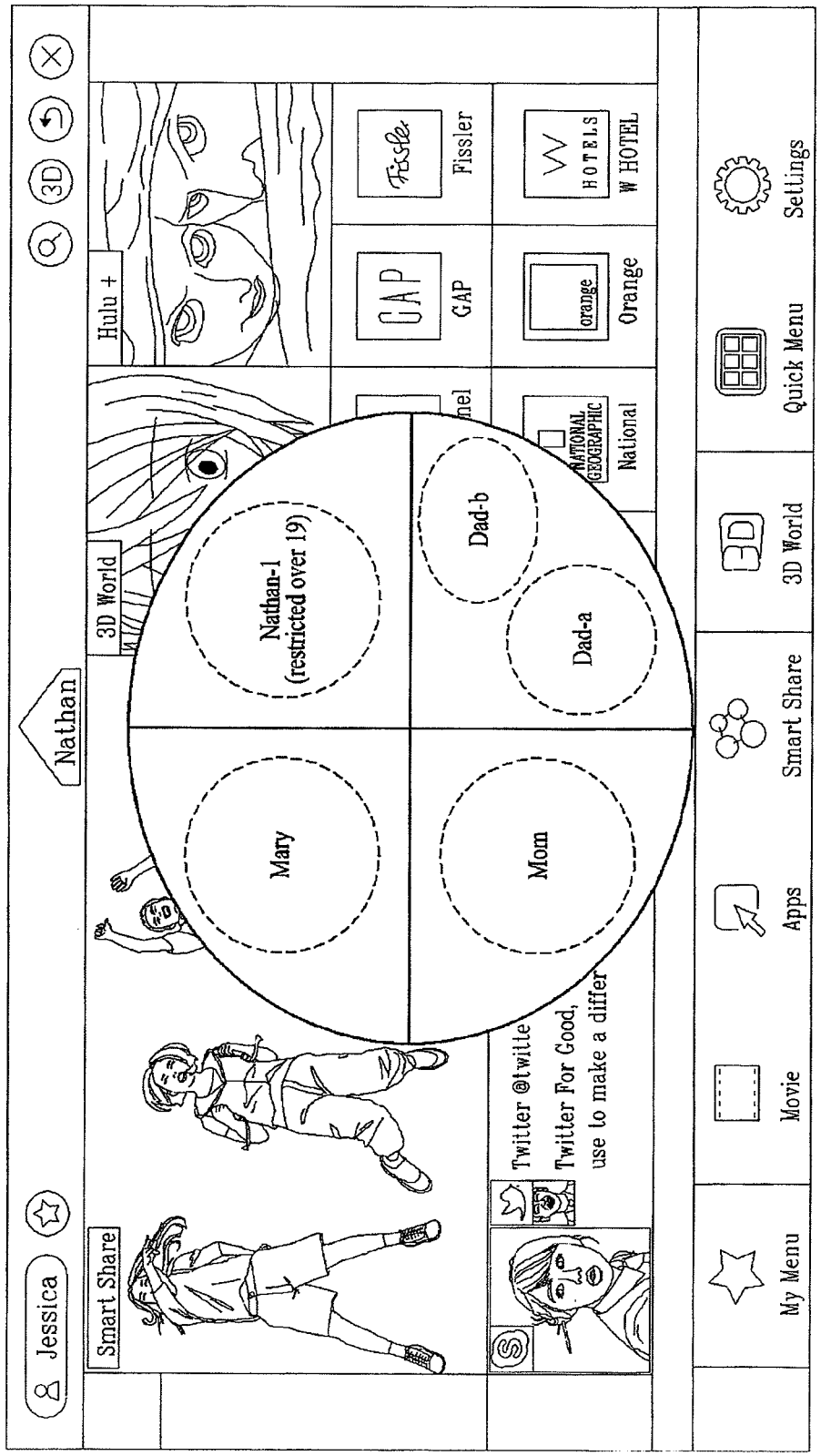

FIG. 37 shows the family mode UIs configured in the form of a circle. The inner part of the circle in FIG. 37 is divided into a plurality of sub-regions, such that each sub-region may be configured to include a page icon or home icon. In the meantime, provided that one user includes a plurality of personalization pages, the number of personalization pages may be displayed, or as many small-sized circles as the number of personalization pages may also be defined as necessary. In addition, not only an identifier but also additional information (for example, "Nathan-1 (restricted over 19)") may be contained in the circular icon.

In FIG. 37, the family mode UIs including personalization pages may also be defined and provided in various shapes, such as a cone, a cylinder, a pyramid, etc.

Figure 38:
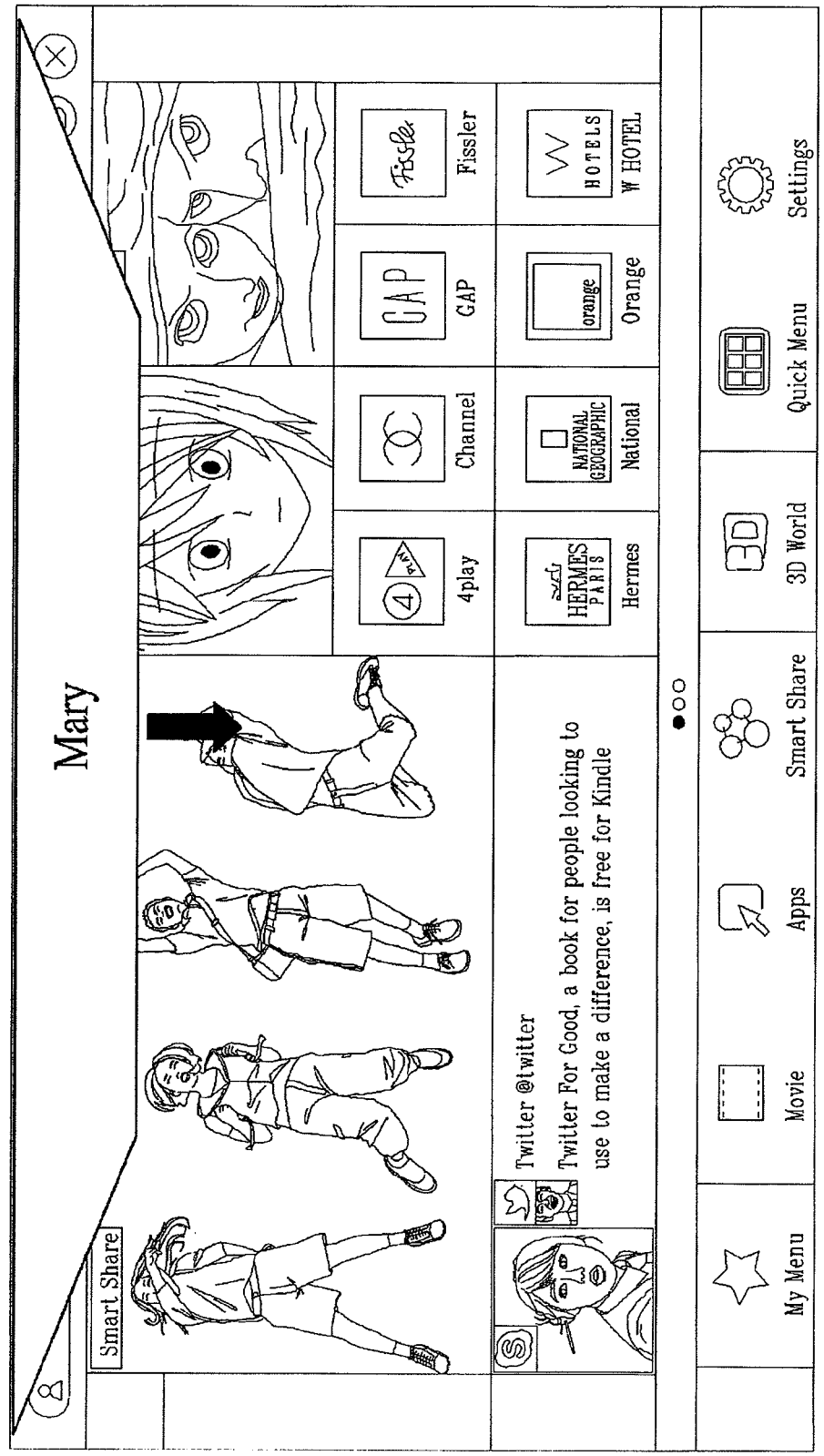

Referring to FIG. 38, if a specific region is pointed, only the UI related to the pointed region may be provided. In this instance, the UI may provide direction information as well as user identification information. In addition, some parts of the personalization pages related to a rectangular-cone shape may be configured in the form of an image.

Figure 39:
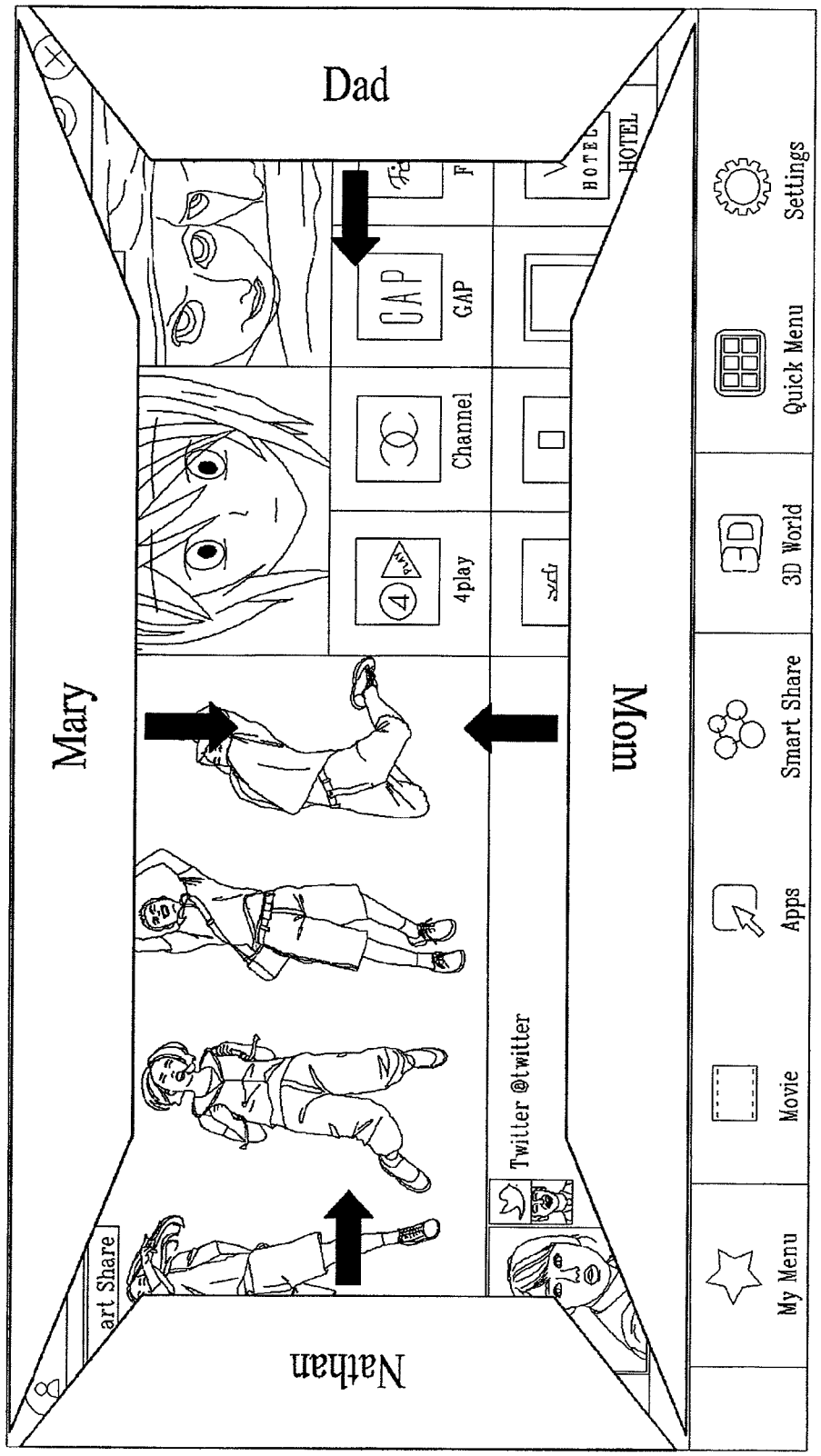

Although the concept of FIG. 39 is similar to the concept of FIG. 38, FIG. 39 shows that UIs of all directions are simultaneously provided as soon as a predetermined region is pointed, whereas FIG. 38 shows that only the UIs of the corresponding region are provided. Therefore, the user can more easily recognize which direction is related to a desired page. In this instance, if there is a plurality of pages, these pages may be denoted by numerals, alphabets, or hierarchical structures. Alternatively, if the corresponding page is dragged to the corresponding direction, UIs of the remaining directions disappear, the current page may move by a predetermined distance corresponding to the number of disappeared UIs or may remain unchanged, or the current page may be covered with a desired page as necessary. In contrast if a plurality of pages exists, each page is represented by a partial image, instead of the full screen, in response to the dragged length. If a specific page is re-selected, the display range of each page may be enlarged to the full screen. For example, assuming that three "Nathan" pages exist, the Nathan is selected and horizontally dragged to the rightmost end, UIs regarding "Mary", "Dad", and "Mom" disappear, and only "Nathan" pages are displayed on the full screen. In this instance, a first Nathan page (i.e., a default page or a first priority page) is displayed on the full screen, and the remaining two pages may be provided as images in a predetermined region of the screen so that a desired one of the two pages can be selected through the images. Alternatively, although the full screen relates to Nathan, three pages are reduced and simultaneously displayed, and the finally selected page is enlarged to the full screen. Of course, the remaining screen images may be configured in the form of images so that they can be displayed at a predetermined region.

Figure 40:
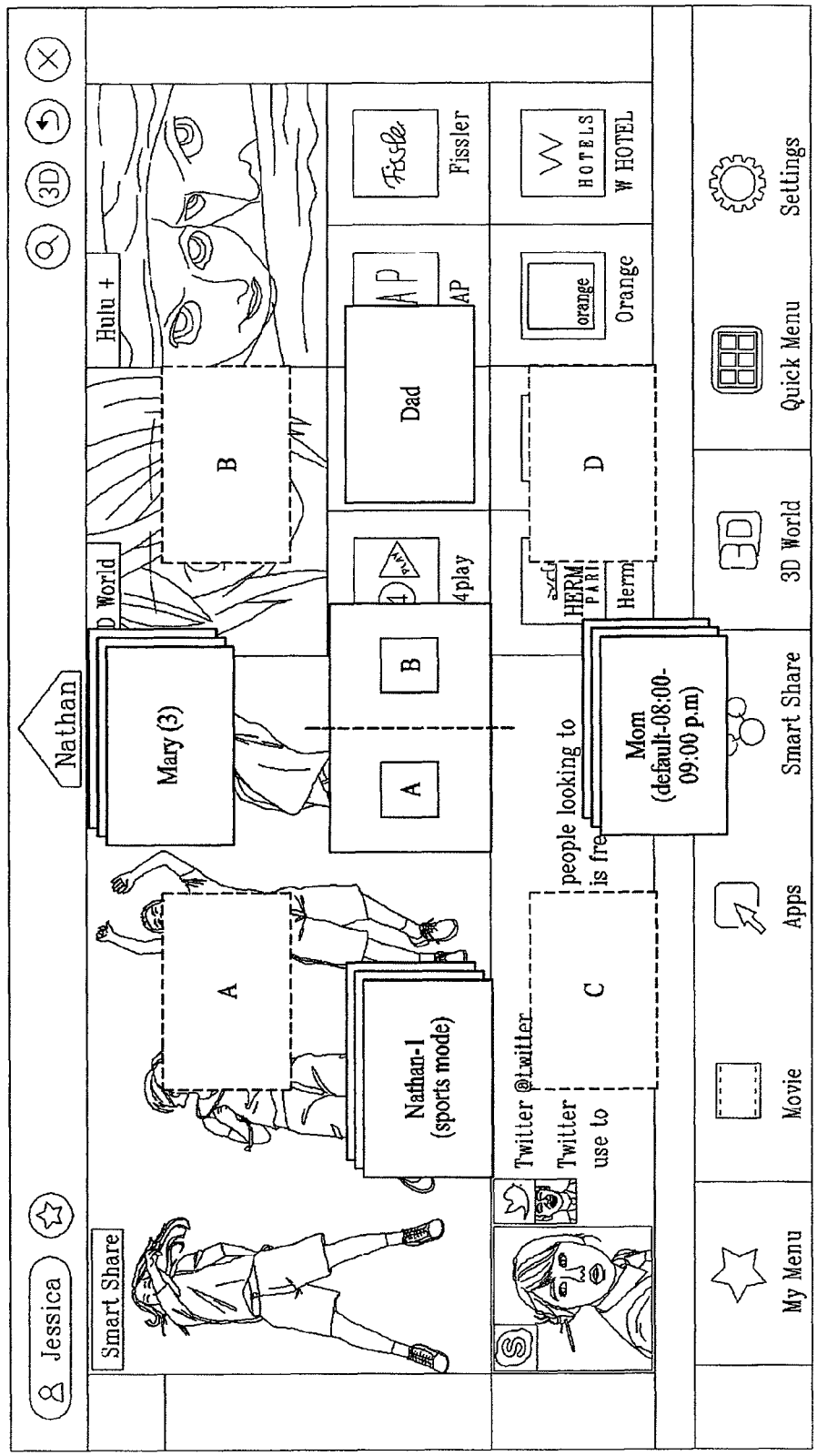

Finally, FIG. 40 is a view illustrating that the family mode is provided in response to the screen division request. In the family mode, if the user inputs a screen division request, the screen division request can be processed using the embodiment of FIG. 40. For example, upon receiving the screen division request, several users can simultaneously use their own pages on the screen.

For example, if the screen division request is received in the family mode, the computing device provides the UIs shown in FIG. 40. Each screen image may be divided into a plurality of sub-images, and each page icon to be located in each region is defined in various shapes or schemes in the vicinity of the page icon in such a manner that the individual page icons can be easily selected.

For example, if "Nathan" is dragged to the region A (half of the screen, left region) and "Mary" is dragged to the region B (half of the screen, right region), individual UIs disappear, the screen is cut in half, the "Nathan" page and the "Mary" page can be simultaneously provided. In this instance, the computing device must control individual constituent elements of the receiver in association with individual pages. If necessary, the computing device may further include a video decoder or an audio decoder, or may sequentially process the corresponding elements or may also process the elements according to priority information. In an instance of audio information, only audio information regarding the high-priority page may be provided to a speaker according to priority information, or audio information regarding the low-priority page may be provided through a separate headphone or the like.

In the family mode UIs shown in FIGS. 31 to 40, if an icon indicating any personalization page of a predetermined user is selected, the UIs may disappear and user personalization pages related to the selected icon may be immediately displayed, or some parts of the user personalization pages related to the selected icon may be previewed at a predetermined region of the screen. In this instance, the user may select the corresponding preview or may perform screen switching through dragging or the like. Alternatively, under the condition that the current page remains unchanged, the selected page may be overlaid on the current page.

Under the condition that a current display state is switched to a display state of personalization pages, if the computing device is powered off and then powered on, the computing device may provide the final page before being powered on, or may also provide the family menu, a default menu or Live broadcasting.

In accordance with the invention, if a predetermined region of the screen (for example, upper, lower, left, right, and diagonal parts of the screen) is pointed, the computing device provides a UI for accessing personalization page(s). In this instance, only the UI of the corresponding region may be provided. However, for convenient access, although only one region is pointed, all UIs related (or linked) to the pointed region can be provided. In the meantime, UIs provided from a specific direction may return to a main homepage of the computing device, instead of returning to the family mode (i.e., the menu related to personalization page access). For example, if the upper part of the screen is pointed, not only UIs related to personalization pages linked to the pointed upper part but also UIs related to personalization pages linked to four cardinal directions (up, down, left, right) may be provided.

Although the above-mentioned embodiments have disclosed only personalization pages on the basis of each direction, it should be noted that a predetermined direction may be replaced with a control page for controlling other electronic devices linked to the home network as needed. In this instance, some parts of the divided screen may be used as a control page as shown in FIG. 36.

Figure 41:
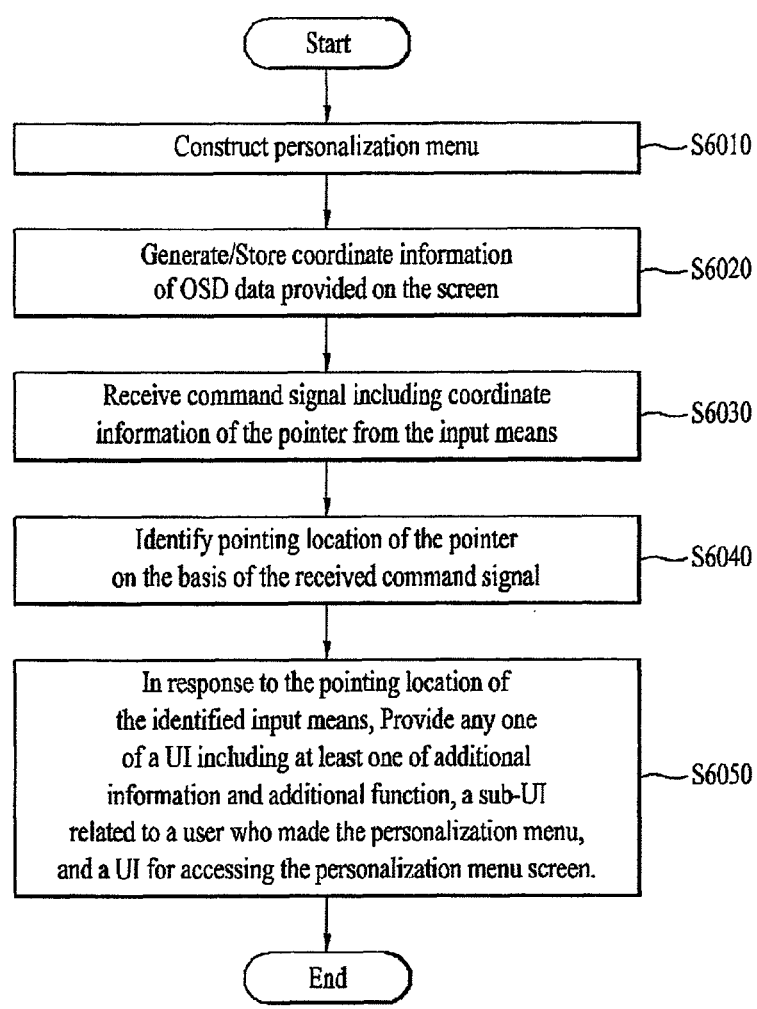
FIG. 41 is a flowchart illustrating an example method for providing a UI according to the invention.

FIG. 41 is a flowchart illustrating an example method for providing UI according to the invention.

Referring to FIG. 41, the computing device constructs the personalization menu in operation S6010, generates coordinate information regarding the OSD data displayed on the screen in operation S6020.

The computing device receives a command signal including coordinate information of the point from the input means in operation S6030, and identifies the location pointed by the pointer on the basis of the received command signal in operation S6040.

In response to the identified pointing location of the input means, the computing device provides any one of a first UI including at least one of additional information and additional function, a second UI (called a sub-UI) related to a user who made the personalization menu, and a third UI for accessing the personalization menu screen in operation S6050.

In the above-mentioned description, additional information or additional function is linked to coordinate information regarding the stored OSD data, and may be determined according to attributes of UI content of the corresponding coordinate information. For example, the additional information may include at least one of channel information, program information, time information, title information, genre information, grade information, rating information, thumbnail images, resolution information, associated content link information, display performance-associated information, codec information, storage capacity information, recording/scheduled recording/viewing information, access admission or denial information, etc. For example, the additional information may include at least one of an update link function, series information link information, a recording or scheduled recording function, a time-shift, a capture function, and an edition function. In addition, UI including at least one of the additional information or the additional function may be implemented by at least one of size change, color change, and border-focusing processing of the legacy UI.

In operation S6010, prestored templates may be used, or may also use any one of templates downloaded through the wired/wireless network or the external device.

On the other hand, when using the sub UIs regarding a plurality of users who made their own personalization menus, if the corresponding UI is accessed, the corresponding sub-UI provides the list of the plurality of users in horizontal or vertical direction. If any one sub UI from among the sub-UI list is selected, the computing device may change a current screen to a personalization menu screen configured for the corresponding user.

In addition, if the pointer of the input means is pointed at a predetermined position, the UI for accessing the personalization menu screen may include, instead of the first user's personalization menu screen currently displayed on the screen, not only a second-user ID for accessing the personalization menu screen of the second user but also an identification icon indicating the accessing direction. The computing device provides the personalization menu screen of the second user according to the change of the pointed position after completion of the pointing action of the pointer. In addition, in response to the position of the changed pointer, the second user's personalization menu screen and the first user's personalization menu screen coexist on the screen of the computing device.

In accordance with another embodiment of the invention, if a user points a predetermined item, button, etc., using the input means such as a pointer, the computing device provides the user with additional information or additional function related (or linked) to the corresponding item, button, etc., such that the user can quickly and easily access the additional information or the additional function. As a result, the computing device can be more smartly utilized by the user. In addition, when several users employs the computing device, the embodiments of the invention can provide not only a customized service for each user (i.e., personalization page(s) for each user) but also a new interface for the movement or access between the personalization menus, such that the user can easily and conveniently use the computing device.

Both product and method inventions have been described in this specification and descriptions of the two inventions may be applied as being supplementary to each other.

The method disclosed in the invention may be implemented in the form of program commands executable by a variety of computer means, and recorded on a computer-readable recording medium.

The computer-readable recording medium may include program commands, data files, data structures, etc., individually or in combination. The program commands recorded on the medium may be specially designed and configured for the invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language code that may be executed by a computer using an interpreter, etc., as well as machine language code such as that produced by a compiler. The above-stated hardware devices may be configured to operate as one or more software modules to perform the operation of the invention, and vice versa.

Although the invention has been described in conjunction with the limited embodiments and drawings, the invention is not limited thereto. Those skilled in the art will appreciate that various modifications, additions and substitutions are possible from this description.

Therefore, the scope of the invention should not be limited to the description of the example embodiments and should be determined by the appended claims and their equivalents.

As is apparent from the above description, the embodiments of the invention have a variety of advantages.

The embodiment of the invention provides a new type of solution for more quickly providing a shortcut function to a user who uses a computing device.

The embodiment of the invention defines a protocol to which a shortcut item can be added, irrespective of the types of multiple functions provided from the computing device.

The embodiment of the invention provides a technology for automatically recognizing a path of a shortcut service according to functions of a current computing device.

In accordance with another embodiment of the invention, if a user points at a predetermined item, button, etc., using the input means such as a pointer, the computing device provides the user with additional information or additional function related (or linked) to the corresponding item, button, etc., such that the user can quickly and easily access the additional information or the additional function. As a result, the computing device can be more smartly utilized by the user.

The embodiment of the invention which, when several users employs the computing device, provides customized personalization page(s) for each user and an interface for accessing the customized personalization pages to each user, such that the user can easily and conveniently use the computing device.

It will be apparent to those skilled in the art that various modifications and variations can be made in the invention without departing from the spirit or scope of the inventions. Thus, it is intended that the invention covers the modifications and variations of this invention provided they come within the scope of the appended claims and their equivalents.

What is claimed is:

1. A method for performing at least one function of a multimedia device in the multimedia device, the method comprising:
   receiving a command signal while performing a first function from among the at least one function;
   capturing a screen image displayed according to the first function;
   determining second functions capable of being mapped to the captured screen image based on a type of the first function, wherein the determined second functions are functionally related to the first function which is being performed, and the determined second functions are different from the first function;
   displaying options for selecting one of the determined second functions to be performed with the captured screen image;
   mapping the selected one of the determined second functions to the captured screen image;
   adjusting at least one of a size and location of the captured screen image based on a type of the first function, wherein the adjusted at least one of size and location of the captured screen image varies according to the type of the first function;
   displaying, on a display, a list comprising a graphic indicator representing at least one application stored in a memory and the captured screen image having the adjusted at least one of size and location;
   performing the second function by selecting the captured screen image to control the multimedia device; and
   if information related to the second function mapped to the captured screen image is updated, changing the captured screen image to a new image representing the updated information,
   wherein a plurality of the same captured screen images which are mapped to the different second functions, respectively, are distinguished from each other by including identifiers representing the mapped second functions.

2. The method according to claim 1, further comprising:
   determining the type of the first function; and
   changing the at least one of size and location of the captured screen image to other size and location values according to the determination result.

3. The method according to claim 1, further comprising:
   generating an application in which the captured screen image having the adjusted at least one size and location is mapped to the first function; and
   storing the generated application in a memory.

4. The method according to claim 1, wherein:
upon receiving the command signal when receiving a first content from a first channel according to the first function, displaying at least one option.

5. The method according to claim 4, wherein:
if a first option from among the at least one displayed option is selected, performing channel switching to the first channel.

6. The method according to claim 4, wherein:
if a second option from among the at least one displayed option is selected, accessing a content provider (CP) that provides an additional service related to the first content.

7. The method according to claim 4, wherein:
if a third option from among the at least one displayed option is selected, displaying some parts of the first content stored in a memory from a start time at which the screen image is captured.

8. The method according to claim 1, wherein the determined second functions vary according to the type of the first function.

9. The method according to claim 1,
wherein the identifier is disposed next to the captured screen image and includes a name of the second function.

10. A multimedia device for performing at least one function of the multimedia device, the multimedia device comprising at least one processor and a display:
the display displaying a screen image while performing a first function from among the at least one function; and
the at least one processor:
capturing the screen image displayed at the display according to the first function when receiving a command signal input by a user,
adjusting at least one of a size and location of the captured screen image captured by the capture circuitry based on a type of the first function, wherein the adjusted at least one of size and location of the captured screen image varies according to the type of the first function,
performing a second function by selecting the captured screen image, and if information related to the second function mapped to the captured screen image is updated, changing the captured screen image to a new image representing the updated information, and
determining second functions capable of being mapped to the captured screen image based on the type of the first function, displaying options for selecting one of the determined second functions to be performed with the captured screen image, and mapping the selected one of the determined second functions to the captured screen,
wherein the determined second functions are functionally related to the first function which is being performed, and the determined second functions are different from the first function, and
wherein a plurality of the same captured screen images which are mapped to the different second functions, respectively, are distinguished from each other by including identifiers representing the mapped second functions.

11. The multimedia device according to claim 10, wherein:
the at least one processor determines the type of the first function; and changes the at least one of size and location of the captured screen image to other size and location values according to the determination result.

12. The multimedia device according to claim 10, wherein: the at least one processor generates an application in which the captured screen image having the adjusted at least one of size and location is mapped to the specific function; and stores the generated application in a memory.

13. The multimedia device according to claim 10, wherein: if the command signal is received while receiving a first content from a first channel according to the first function, the display displays at least one option.

14. The multimedia device according to claim 13, wherein: if a first option from among the at least one displayed option is selected, the at least one processor performs channel switching to the first channel.

15. The multimedia device according to claim 13, wherein: if a second option from among the at least one displayed option is selected, the at least one processor accesses a content provider (CP) providing an additional service related to the first content.

16. The multimedia device according to claim 13, wherein: if a third option from among the at least one displayed option is selected, the display displays some parts of the first content stored in a memory from a start time at which the screen image is captured.

17. The multimedia device according to claim 10, further comprising:
a network interface configured to provide a video phone service established with at least one user according to the first function.

18. The multimedia device according to claim 17, wherein:
while the video phone service is achieved through the network interface,
the at least one processor extracts identification information corresponding to the at least one user and transmits a calling signal using the extracted identification information.

19. The multimedia device according to claim 10, wherein the at least one processor controls a graphic image accessing at least one personalization page to be displayed on a first region of a screen of the display, and displays the captured image on a second region of the screen of the display.

20. The multimedia device according claim 10, wherein the determined second functions vary according to the type of the first function.

21. The multimedia device according claim 10, wherein the identifier is disposed next to the captured screen image and includes a name of the second function.

* * * * *